(12) United States Patent
Frascadore

(10) Patent No.: US 10,721,074 B2
(45) Date of Patent: *Jul. 21, 2020

(54) METHODS AND APPARATUS TO AUTHENTICATE AND DIFFERENTIATE VIRTUALLY IDENTICAL RESOURCES USING SESSION CHAINING

(71) Applicant: VMware, Inc., Palo Alto, CA (US)

(72) Inventor: Gregory A. Frascadore, Colorado Springs, CO (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/273,107

(22) Filed: Feb. 11, 2019

(65) Prior Publication Data

US 2019/0280874 A1    Sep. 12, 2019

Related U.S. Application Data

(63) Continuation of application No. 15/243,673, filed on Aug. 22, 2016, now Pat. No. 10,205,595.

(Continued)

(51) Int. Cl.
*H04L 29/06* (2006.01)
*H04L 9/32* (2006.01)
(Continued)

(52) U.S. Cl.
CPC .......... *H04L 9/3242* (2013.01); *H04L 9/0643* (2013.01); *H04L 9/0662* (2013.01);
(Continued)

(58) Field of Classification Search
CPC ..... H04L 9/3242; H04L 67/10; H04L 67/141; H04L 63/061; H04L 41/0213; H04L 41/046; H04L 41/048
See application file for complete search history.

(56) References Cited

U.S. PATENT DOCUMENTS 6,643,774 B1 * 11/2003 McGarvey ............ H04L 63/062
                                                                380/259
7,240,201 B2   7/2007 Neufeld et al.
(Continued)

OTHER PUBLICATIONS

United States Patent and Trademark Office, "Non-Final Office Action," issued in connection with U.S. Appl. No. 15/243,673, dated Mar. 22, 2018, 27 pages.

(Continued)

*Primary Examiner* — Hosuk Song
(74) *Attorney, Agent, or Firm* — Hanley, Flight & Zimmerman, LLC

(57) ABSTRACT

Methods and apparatus to authenticate and differentiate virtually identical resources using session chaining are disclosed. In response to a session request from at least one of a management device or a resource, example methods and apparatus locate a session chain stack associated with an identifier of the at least one of the management device or the resource, and determine whether a first nonce at a top of the session chain stack associated with the identifier of the at least one of the management device or the resource is equal to a second nonce associated with the session request from the at least one of the management device or the resource. Upon determining that the nonce at the top of the session chain stack associated with the identifier of the at least one of the management device or the resource is equal to the second nonce, example methods and apparatus initiate a session between the management device and the resource, and re-negotiate the second nonce between the management device and the resource to generate a third nonce.

20 Claims, 9 Drawing Sheets

Related U.S. Application Data

(60) Provisional application No. 62/353,531, filed on Jun. 22, 2016.

(52) U.S. Cl.
CPC ........ H04L 9/0844 (2013.01); H04L 41/0896 (2013.01); H04L 63/061 (2013.01); H04L 63/0823 (2013.01); H04L 67/141 (2013.01); H04L 41/048 (2013.01); H04L 67/10 (2013.01)

(56) References Cited

U.S. PATENT DOCUMENTS

| | | | |
|---|---|---|---|
| 7,818,792 B2 | 10/2010 | Shamsaasef et al. | |
| 8,104,073 B2 * | 1/2012 | Hanna | H04L 63/12 713/168 |
| 8,627,063 B2 * | 1/2014 | Edstrom | H04L 63/0823 713/151 |
| 8,738,913 B2 | 5/2014 | Hahn et al. | |
| 9,098,318 B2 | 8/2015 | Frascadore | |
| 9,270,674 B2 | 2/2016 | Lang et al. | |
| 10,205,595 B2 * | 2/2019 | Frascadore | H04L 9/0643 |
| 2008/0250406 A1 | 10/2008 | Carpenter et al. | |
| 2011/0055580 A1 | 3/2011 | Narasimhan | |
| 2017/0373854 A1 | 12/2017 | Frascadore | |

OTHER PUBLICATIONS

United States Patent and Trademark Office, "Notice of Allowance," issued in connection with U.S. Appl. No. 15/243,673, dated Sep. 26, 2018, 22 pages.

* cited by examiner

METHODS AND APPARATUS TO AUTHENTICATE AND DIFFERENTIATE VIRTUALLY IDENTICAL RESOURCES USING SESSION CHAINING

RELATED APPLICATION

This patent is a continuation of and claims the benefit of U.S. patent application Ser. No. 15/243,673, filed Aug. 22, 2016, which claims priority to and the benefit of U.S. Provisional Patent Application Ser. No. 62/353,531, filed Jun. 22, 2016. U.S. patent application Ser. No. 15/243,673 and U.S. Provisional Patent Application Ser. No. 62/353,531 are hereby incorporated by reference herein in their entireties.

FIELD OF THE DISCLOSURE

This disclosure relates generally to computational resource management and, more particularly, to methods and apparatus to authenticate and differentiate virtually identical resources using session chaining.

BACKGROUND

In computing environments, computational resources, such as software applications, are often monitored and/or managed by a management system. Some computational resources, such as virtual machines, may be easily reproduced as copies, and the copies may appear identical to an original.

DETAILED DESCRIPTION

Figure 1:
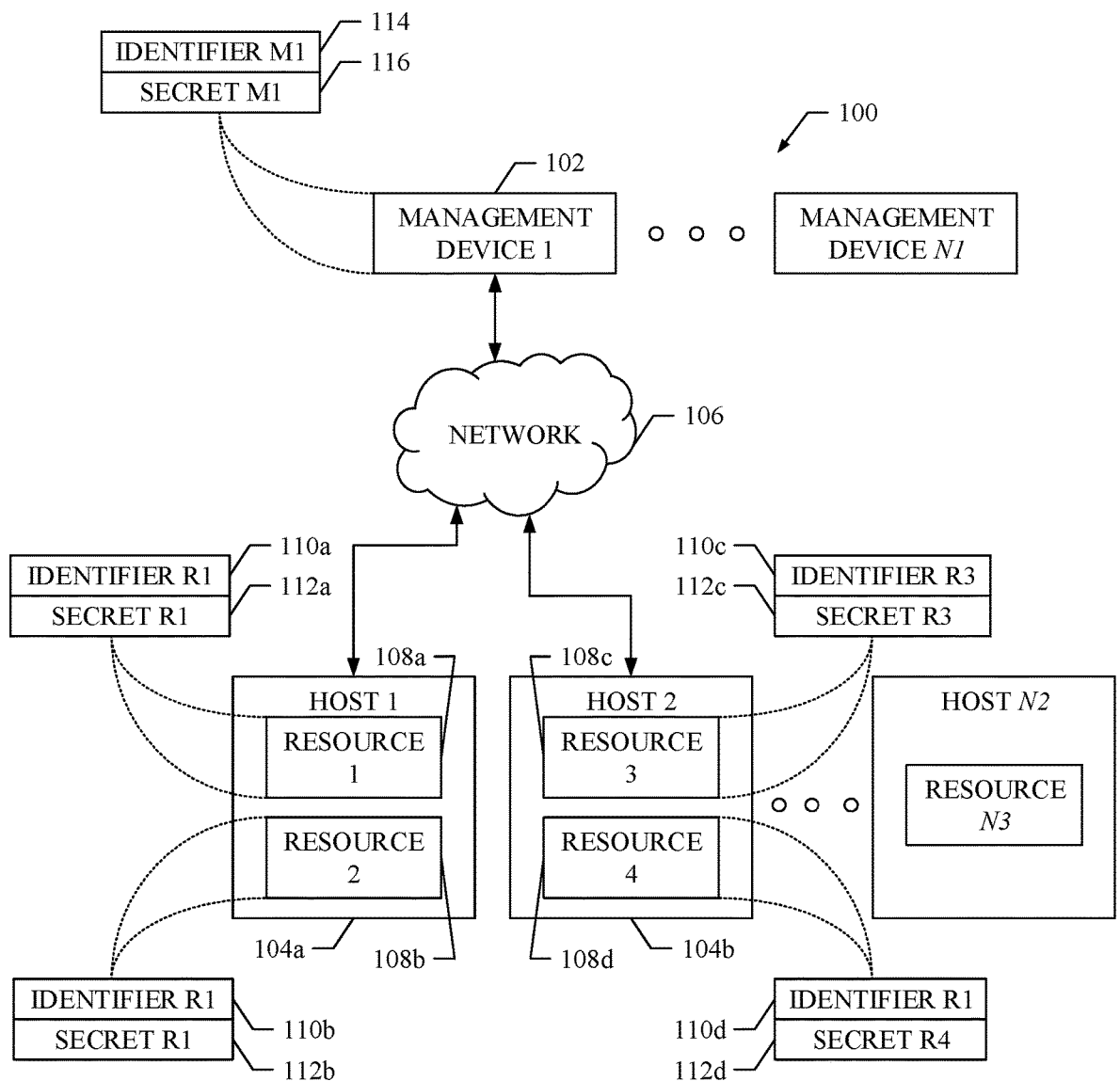
FIG. 1 is a block diagram of an example environment including one or more example management devices and one or more example hosts containing resources.

Computational resources, such as those in a virtual computing environment, are often managed by a management service. Some such computational resources are software applications subject to (e.g., responsive to) commands from the management service (e.g., manager software application) executed by a management device. Example computational resources include, virtual machines ("VMs"); software appliances; management agents, such as a Common Information Management (CIM) agent, a Simple Network Management Protocol (SNMP) agent, and/or a configuration management agent; cloud services; mobile agents (e.g., mobile software application code and a corresponding application state); and/or business services (e.g., Information Technology Infrastructure Library services).

Management services often authenticate computational resources by associating an identity with an identifier and a secret corresponding to the identifier held by the computational resource. Different computational resources often have differing identifiers and secrets. In some examples, the identifiers may be publically known (e.g., known or available to multiple parties). In some examples, the secrets may be confidential (e.g., known only by that resource and/or a corresponding management service/device). In other examples, the secrets may be only privately known (e.g., known only by that resource).

In some contexts, computational resources are replicated or otherwise copied. In some such contexts, the entire resource is replicated, including its secrets. In such an event, the original resource and the copy are indistinguishable (e.g., they are associated with a same identifier and a same secret and, thus, they are identical). Indistinguishable duplicate resources may occur due to any of numerous reasons or events, including, for example, restoring a snapshot of a resource; forking a virtual machine; instantiating a new identical virtual machine; creating and/or running a container from an image; committing, saving, or exporting a container; migrating a virtual machine and/or container to a new host; copying and/or backing up virtual machine disks and/or container files in a file system, etc.

Resources that contain the same identifier and the same secret appear to have the same identity and are referred to herein as "virtually identical resources" or "identical resources." When faced with such virtually identical resources, management services cannot distinguish between the copy and the original resource. Indistinguishability can be extremely problematic. For example, assume a first resource has a vulnerability. If the first resource is duplicated by, for example, a snapshot, prior to the management device patching the vulnerability, a subsequent restore of the first resource from the snapshot will effectively undo the vulnerability patch. In such examples, the management device in communication with the first resource may be unaware that the first resource is vulnerable and may not seek to correct it. As such, the vulnerability may continue to exist and/or be exploited.

Examples disclosed herein distinguish between virtually identical resources thereby overcoming problems caused by copying, cloning, replication, migration, snapshot versioning, and/or other methods of duplication. Examples disclosed herein are effective regardless of whether the management device and/or resources are hosted in a physical or virtual environment and regardless of whether reproduction results in virtual, physical, or mixed copies. Examples disclosed herein ensure that the state of a resource is the state expected with respect to management device-initiated changes, and that the management device and/or the resource has a correct identity. This reduces the likelihood of success of spoofing or other efforts to exploit security vulnerabilities.

In some examples, resources are associated with resource identifiers (e.g., certificates, private keys, public keys, etc.). In some such examples, a management device negotiates one or more nonces with the resource during a communication session. As used herein, a communication session is a collection of messages including an authentication phase and a nonce (re)negotiation. In some examples, multiple communications occur between the authentication phase and the nonce (re)negotiation. In some examples, the nonce need not be renegotiated for every message sent and/or received during a session.

The example management device and the example resource each associate the one or more nonces with the opposite party's identifier. In examples disclosed herein, when either the example management device or the example resource requests initiation of a session with the other party, the sender is expected to include, with the session request, proof of the sender's knowledge of the current (e.g., a most recently negotiated) nonce. Similarly when responding to a request, the responder is expected to include, with the reply to the request, proof of the responder's knowledge of the current nonce. In some examples, requests and/or responses (e.g., replies) are encrypted with the current nonce. In such examples, successful decryption using the current nonce as the decryption key proves knowledge of the current nonce. In some examples, the nonce currently known by a resource is included in a request/reply and that nonce is compared to the nonce currently known by the management device for equality. In some examples, the nonce currently known by the management device is included in a request/response/reply and that nonce is compared to the nonce known by the resource for equality. In some examples, the management device uses a resource identifier to locate one or more locally stored nonces for comparison. In some examples, the resource uses a management device identifier to locate one or more locally stored nonces for comparison. In some examples, authentication of existing integrity protecting protocols is extended to include proof that a resource is the same resource as the one claiming the identity in all previous sessions (e.g., a correct sequence or session chain stack including the current and previously negotiated nonces is verified).

As used herein, a communication session (sometimes referred to herein as a "session") is defined as a series of communication transactions between two parties. Such a session may, for example, occur over a standard protocol, such as, for example, Secure Shell ("SSH"), Transport Layer Security ("TLS"), etc. TLS communication provides an integrity protected session over a secure channel and may advantageously be employed in examples disclosed herein.

As used herein, the function H(v1, v2) is defined as a keyed hash function of variables v1 and v2. In some examples, H(v1, v2) is a Hash-based Message Authentication Code Secure Hash Algorithm 512 ("HMAC-SHA512") based on a standards document, such as, for example, RFC-2104 or RFC-4868. As used herein, a semicolon ";" used between variables is defined to be concatenation of the variables (e.g., a;v1 is concatenation of a and v1). As used herein, the function $g^{v3}$ is defined as an exponentiation of a constant g to the power of variable v3. In some examples, g is a Diffie-Hellman-Merkle ("DH") base value from a standards document, such as, for example, RFC-2631 or RFC-3526. As used herein, the variable p is defined to be a prime number. In some examples, p is a large prime number from a standards document, such as, for example, RFC-3526. As used herein, the function v4 mod v5 is defined to be the modulo operation, which determines the remainder after division of variable v4 by variable v5.

As used herein, the sign "=" refers to assignment (e.g., the right value is assigned to the left variable). As used herein, the sign "==" refers to equality (e.g., the left and right values are equal). As used herein, the sign "!=" refers to not equal to (e.g., the left value is not equal to the right value). As used herein, the term "TOP" refers to the value that is on the top of the stack. As used herein, the function "TOP( )" returns the top element of a stack without removing it from the stack. As used herein, the function "PUSH(v6)" pushes variable v6 onto stack making TOP( )==v6. As used herein, the function "POP( )" removes and returns the top value on the stack. As used herein, the function "PUT(v7)" replaces the value on top of the stack with variable v7. As used herein, "PEEK" refers to the value that is beneath the top of the stack. As used herein, the function "PEEK( )" returns the element below the top of the stack without removing it. As used herein, the function "DUP( )" duplicates the top of the stack making TOP==PEEK. As used herein, $$(g^B \bmod p)^A \bmod p == (g^A \bmod p)^B \bmod p. \text{ As used herein, } H(((g^B \bmod p)^A \bmod p), TOP) == H(((g^A \bmod p)^B \bmod p), TOP).$$

FIG. 1 is a block diagram of an environment 100 including example management device devices (e.g., management device 1 102 through management device N1) and one or more hosts (e.g., host 1 104*a*, host 2 104*b*, up to N2 hosts) in selective communication via a network 106. Respective ones of the one or more hosts (e.g., host 104*a*, 104*b*) include one or more resources (e.g., resource 1 108*a*, resource 2 108*b*, resource 3 108*c*, resource 4 108*d*, up to N3 resources). In some examples, at least one of the resources (e.g., one of resource 1 108*a*, the resource 2 108*b*, the resource 3 108*c*, or the resource 4 108*d*) is a Virtual Machine ("VM"). In the illustrated example, each of the resources (e.g., the example resource 1 108*a*, the example resource 2 108*b*, the example resource 3 108*c*, and the example resource 4 108*d*) contains unique identifying information and one or more secrets for authenticating with the example management device 1 102.

As disclosed herein, any or all of the resources 108*a*, 108*b*, 108*c*, 108*d* may be replicated. When a resource is replicated, the identifying information and any secret for authenticating with the example management device 1 102 that are contained within the resource may be replicated as well. For example, the example resource 1 108*a* of FIG. 1 is identified by an identifier R1 110*a* and a secret R1 112*a*. For purposes of illustration, assume that resource 2 108*b* is a copy of resource 1 108*a*. As a result, the resource 2 108*b* is identified by the identifier R1 110*b* and the secret R1 112*b*, which are respectively identical to the identifier R1 110*a* and the secret R1 112*a* of the resource 1 108*a*. In the illustrated example, the resource 3 108*c* is identified by an identifier R3 110*c* and a secret R3 112*c*. In the illustrated example, the resource 4 108*d* is identified by an identifier R1 110*d* and a secret R4 112*d*. In this example, the resource 4 108*d* is an older version of the resource 1 108*a* as identified by identifier R1 110*d*, but has a different secret R4 112*d*.

In some examples, numerous resources communicate with one or more management devices. In such examples, the resources and/or management devices maintain lookup tables associating resource/management device identifiers with expected secrets, because different secrets may be expected from different resources. For example, when a communication session is initiated between the management device 1 102 and the resource 1 108a, the management device 1 102 identifies the resource 1 108a by the identifier R1 110a. In examples wherein the resource 1 108a and the management device 1 102 have not previously communicated, the management device 1 102 associates any secrets (e.g., secret M1 116) negotiated during the communication session (as further described below) with the identifier R1 110a. In such examples, the management device 1 102 includes one or more lookup tables associating resource identifiers (e.g., resource identifier R1 110a) with expected secrets (e.g., secret M1 116). In examples wherein the resource 1 108a and the management device 1 102 have previously communicated, the management device 1 102 locates an expected secret (e.g., previously negotiated secret M1 116) based on the resource identifier R1 110a and the one or more lookup tables.

Similarly, resource 1 108a identifies the management device 1 102 by an identifier M1 114. In examples wherein the resource 1 108a and the management device 1 102 have not previously communicated, the resource 1 108a associates any secrets (e.g., secret R1 112a) negotiated during the communication session (as further described below) with the identifier M1 114. In such examples, the resource 1 108a includes one or more lookup tables associating management device identifiers with expected secrets (e.g., secret R1 112a). In examples wherein the resource 1 108a and the management device 1 102 have previously communicated, the resource 1 108a locates an expected secret (e.g., previously negotiated secret R1 112a) based on the identifier M1 114 and the one or more lookup tables.

In the illustrated example of FIG. 1, the resource 2 108b has the same identifier R1 110b and secret R1 112b as the resource 1 108a (e.g., the identifier R1 110a and the secret R1 112a). In examples wherein a secret is persistent (e.g., the secret does not change), the management device 1 102 cannot distinguish resource 1 108a from resource 2 108b. However, when the secret has changed, the management device 1 102 can identify old cop(ies). For instance, in the example of FIG. 1, the example management device 1 102 can distinguish example resource 4 108d from example resource 1 108a even though they share the same identifier R1 based on the differences in their secrets (e.g., R1 112a vs. R4 112d). Similarly, the example management device 1 102 can distinguish example resource 3 108c from example resource 1 108a based on the difference(s) in the example identifiers (R1 110a, R3 110c) and/or example secrets (R1 112a, R3 112c).

Because, the management device 1 102 cannot distinguish virtually identical resources, the first one of the virtually identical resources (e.g., resource 1 108a and resource 2 108b) to connect to and authenticate with the management device 1 102 to begin a communication session, will claim the identity as the original resource (e.g., not a duplicate or copy). As disclosed herein, to distinguish replicated resources in subsequent sessions, a nonce (e.g., secret) is negotiated during each session between the resource and the management device such that copies of a connecting resource will lack the most recent or current nonce (e.g., compare the secret R1 110a of resource 1 108a to the secret R4 112d of resource 4 108d). In some examples, the resources lacking the current nonce value are assigned new identities (e.g., identifiers and secrets/nonces) that will distinguish each resource from one other. In some examples, a history of previously negotiated nonces and the current nonce are stored in a stack and used to identify and distinguish resources.

In some examples, knowledge of the current nonce does not always indicate that the resource is, in fact, the same resource that connected to the management device 1 102 during a previous session. For example, resource 2 108b may be a duplicate of previously connected resource 1 108a, created after the current nonce was re-negotiated between the management device 1 102 and the resource 1 108a. Regardless of whether the connecting resource is an "original" or a "duplicate," if the connecting resource is functionally equivalent to the original resource (e.g., is a copy), then it is capable of assuming the original's identity such that considering the connecting resource to be the original resource results in proper operation. Accordingly, in some examples, the duplicate resource becomes the original, as described above, and the original resource becomes a duplicate. In other words, the first of the original and duplication resource to engage in a session with the management device becomes the original resource going forward.

Figure 2:
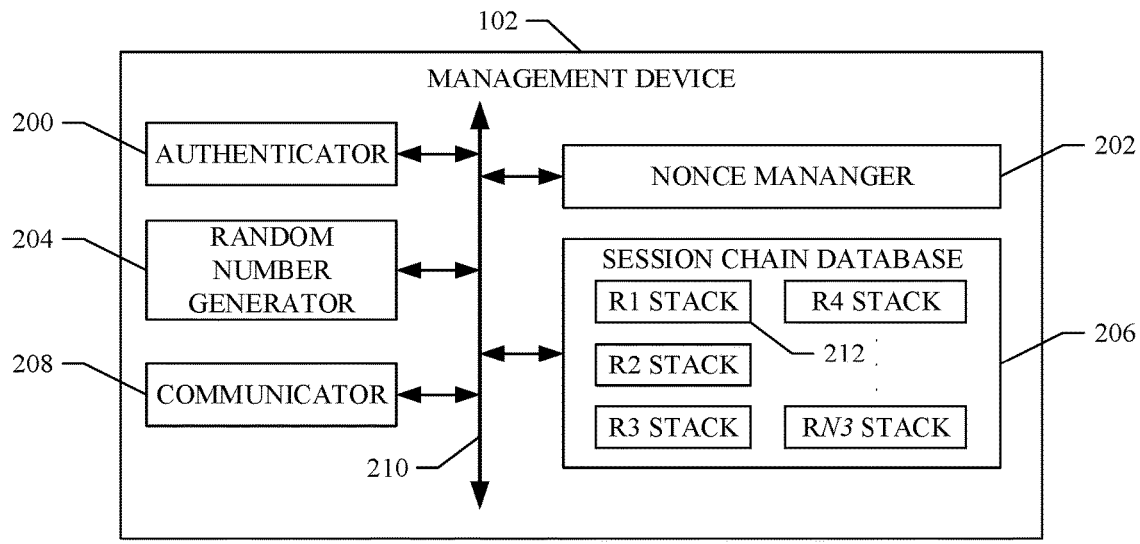
FIG. 2 is an example implementation of any of the example management devices of FIG. 1.

FIG. 2 is an example implementation of the example management device 1 102 of FIG. 1. The example management device 1 102 includes an example authenticator 200, an example nonce manager 202, an example random (or pseudo random) number generator 204, an example session chain database 206, and an example communicator 208. In some examples, the authenticator 200, the nonce manager 202, the random (or pseudo random) number generator 204, the session chain database 206, and the communicator 208 are all communicatively coupled via a bus 210.

The example authenticator 200 of the example management device 1 102 authenticates session connections based on identifiers and/or nonces sent from the example resource involved in the session (e.g., example resource 1 108a, example resource 2 108b, example resource 3 108c, etc.). In examples wherein a management device (e.g., management device 1 102) and a resource (e.g., resource 1 108a) have not previously communicated (e.g., no identifiers and/or secrets), the authenticator 200 generates identifiers for the management device 1 102 and/or the resource 1 108a for future identification. For example, the example authenticator 200 generates a public-private cryptographic key pair, embeds the public key in a certificate, and uses the certificate as the management device 1 102 identifier M1 114 (FIG. 1). In some examples, the authenticator 200 of FIG. 2 generates a public-private cryptographic key pair, embeds the public key in a certificate, and uses the certificate as the resource 1 108a identifier R1 110a (FIG. 1). In some examples, the authenticator 200 receives authentication credentials (e.g., identifier/certificate) corresponding to the integrity protecting protocol used to establish the session.

When the example authenticator 200 receives an identifier from the example resource involved in the session (e.g., identifier R1 110a), the authenticator 200 locates a stack of nonces stored in the example session chain database 206 associated with the received identifier (e.g., R1 stack 212). As disclosed herein, a management device communicates with one or more resources and a resource communicates with one or more management devices. Accordingly, the example authenticator 200 accesses different stacks of nonces (e.g., session chains) for different resources (e.g., R1 stack 212 to RN3 stack). For example, when the authenticator 200 receives a nonce from the example resource (e.g., resource 1 108a) involved in the session (e.g., secret R1 112a), the example authenticator 200 verifies whether one or more nonces in the stack of nonces stored in the example session chain database 206 associated with the received identifier (e.g., R1 stack 212) correspond to the received nonce. In some examples, the authenticator 200 compares nonces from the example resource 1 108a to nonces in the example session chain database 206. In some examples, the authenticator 200 uses nonces in the example session chain database 206 as decryption keys to decrypt encrypted messages received from the resource 1 108a, wherein successful decryption indicates a matching nonce (e.g., the messages were encrypted with the nonce the example authenticator 200 used to decrypt the messages).

The example nonce manager 202 of the example management device 1 102 of FIG. 2 generates and/or negotiates/re-negotiates nonces with the example resource involved in a communication session (e.g., resource 1 108a). The example nonce manager 202 includes DH parameters g and p. In some examples, g is equal to 2 and p is equal to $2^{2048}-2^{1984}-1+2^{64}*(Floor[2^{1918\pi}]-1+124476)$. As used herein, the function Floor(v1) outputs the largest integer less than or equal to v1 (e.g., the largest integer less than or equal to $2^{1918\pi}$). In some examples, p is value id14 from RFC-3526. In some examples, p is defined to be:
32317006071311007300338913926423828248817941241140239112842009751400741706634354222619689417363569347117901737909704191754605873209195028853175898618562215321217541251490177452027023579607823624888424618947758764110592864609941172324542662252219323054091903768052423551912567971587011700105805587765103886184728025797605490356973256152616708133936179954133647655916036831789672907317838458968063967190097720219416864722587103141133642931953619347163653320971707744822798858856536920864529663607725026895550592836275112117409697299806841055435958486658329164213621828231078990999448652468262416972035911852507045361090559.

Alternatively, other values of g and p may be selected from standards documents such as, for example, RFC-2104, RFC-4868, RFC-2631, RFC-3526, etc., as long as g and p are mutually agreed upon by the example management device 1 102 and the example resource 1 108a. The example nonce manager 202 of the illustrated example includes a keyed cryptographic hash algorithm, such as, for example, H=HMAC-SHA512. In some examples, the nonce manager 202 receives a DH public key $g^A$ mod p from the resource involved in a communication session (e.g., resource 1 108a). In some such examples, the nonce manager 202 determines a DH private key (e.g., A) based on the DH public key received from the resource involved in a communication session (e.g., resource 1 108a). In some examples, the nonce manager 202 determines a DH public key for the management device 1 102. In some such examples, the nonce manager 202 receives a DH private key B from the example random (or pseudo random) number generator 204 and exponentiates g to the power of B modulo p (e.g., $g^B$ mod p) to determine the DH public key for the management device 1 102. The example nonce manager 202 of FIG. 2 uses the previous nonce TOP (e.g., the nonce currently on top of an example session chain stack), the DH parameters g and p, the DH public key $g^A$ mod p, the DH private key B, and the keyed cryptographic hash algorithm H=HMAC-SHA512 to determine a new nonce (e.g., H((($g^A$ mod p)$^B$ mod p), TOP)). In some examples, after determining the new nonce, the example nonce manager 202 duplicates the new nonce to store two copies of the new nonce in a session chain stack. In some examples, the nonce manager 202 of the management device involved in the session stores a first copy of the new nonce on the session chain stack (e.g., prepare phase) and waits for a commit instruction from the resource involved in the session prior to storing a second copy of the new nonce on the session chain stack (e.g., commit phase). In some examples, the nonce manager 202 manages example session chain stacks through functions PUSH( ), POP( ), PUT( ), DUP( ), etc. to remove and/or add nonces to the example session chain stacks.

The example random number generator (which may be a pseudo random number generator) 204 of the example management device 1 102 of FIG. 2 generates a stream of random (or pseudo random) values for the example nonce manager 202. In some examples, the random (or pseudo random) number generator 204 is a hardware random number generator or pseudo random number generator. In such examples, the random (or pseudo random) number generator 204 generates random (or pseudo random) values based on one or more physical processes exhibiting a characteristic that varies randomly over time. In some examples, the random (or pseudo random) number generator 204 is implemented using one or more equations and is "seeded" with an initial value. In some examples, the initial value (e.g., a seed value) is random. For example, the seed value may be based on a randomly selected byte of data obtained during communication. The example random (or pseudo random) number generator 204 generates the DH private key B for the example nonce manager 202.

The example session chain database 206 of the example management device 1 102 of FIG. 2 stores a time ordered series of negotiated and/or re-negotiated nonces for each resource. The example session chain database 206 stores a number of nonces to chain together different sessions (e.g., session chaining) to create an identity (e.g., identity 616). Separate session chains (e.g., stacks of nonces) are stored within the example session chain database 206 corresponding to respective ones of the example resources. In some examples, the TOP of the stack is equal to H((($g^A$ mod p)$^B$ mod p), PEEK). As shown further in FIGS. 4A-4B, the PEEK of the stack is the nonce below the TOP of the stack (e.g., TOP−1). The example session chain database 206 stores any number of nonces (e.g., from TOP to TOP−N). In the illustrated example of FIG. 2, the example session chain database 206 is a tangible computer readable storage medium such as a hard drive, a CD-ROM, a floppy disk, a digital versatile disk (DVD), a Blu-ray disk, or other memory storage device or storage disk.

The example communicator 208 of the example management device 1 102 of FIG. 2 initiates a session and communicates with the example resource 1 108a during the session. A session may be initiated with resources to transfer information and/or perform one or more functions, such as, for example, auditing, monitoring, scheduling, etc. The example session is a series of messages between an example management device (e.g., management device 1 102) and an example resource (e.g., resource 1 108a). In some examples, the session is conducted in accordance with an integrity protecting protocol, such as, for example, TLS, wherein continuous authentication for each message is not required. In such examples, once a session has been initialized and a nonce has been negotiated, the example management device (e.g., management device 1 102) and the example resource (e.g., resource 1 108a) communicate without renegotiating nonces for every message sent and/or received until the session is terminated.

Figure 3:
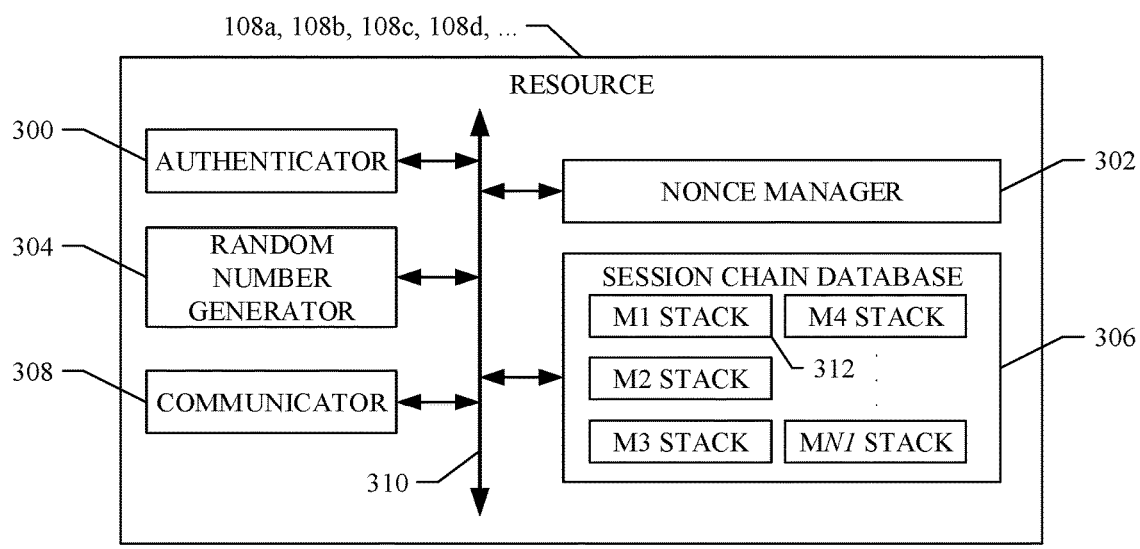
FIG. 3 is an example implementation of any of the example resources of FIG. 1.

FIG. 3 is an example implementation of any of the example resources of FIG. 1 (e.g., it could implement any of the example resource 1 108a, example resource 2 108b, example resource 3 108c, example resource 4 108d, etc. of FIG. 1). In the example of FIG. 3, the resource is implemented similarly to the example management device of FIG. 2. For instance, the example resource of FIG. 3 includes an example authenticator 300, an example nonce manager 302, an example random (or pseudo random) number generator 304, an example session chain database 306, and an example communicator 308. In some examples, the authenticator 300, the nonce manager 302, the random (or pseudo random) number generator 304, the session chain database 306, and the communicator 308 are all communicatively coupled via a bus 310. The example authenticator 300, the example nonce manager 302, the example random (or pseudo random) number generator 304, the example session chain database 306, and the example communicator 308 of FIG. 3 are structured similarly and perform similarly to the example authenticator 200, the example nonce manager 202, the example random (or pseudo random) number generator 204, the example session chain database 206, and the example communicator 208 of FIG. 2. Therefore, a description of these structures will not be repeated. Instead, the interested reader is referred to the corresponding discussion of the like numbered structure in FIG. 2.

In some examples, a resource communicates with one or more management devices. Accordingly, the example authenticator 300 accesses different stacks of nonces (e.g., session chains) for different management devices (e.g., M1 stack 312 to MN1 stack). In some examples, the one or more resources (e.g., resource 1 to resource N3) may implement the one or more management devices (e.g., management device 1 to management device N1). For example, instead of a resource being the sender and a management device being the receiver during a session as described above, the management device may be the sender and the resource may be the receiver during the session. In some examples, the one or more resources 108a, 108b, 108c, 108d, etc. may initiate sessions amongst themselves.

In operation, the example resource of FIG. 3 and the example management device of FIG. 2 initiates a session. The example authenticator 300 of the example resource of FIG. 3 provides credentials, such as, for example, an identifier (e.g., a TLS certificate) and a nonce, to the example authenticator 200 of the example management device of FIG. 2. The example authenticator 200 determines whether the example authenticator 300 provided the correct credentials for authentication. For example, the authenticator 200 determines whether the identifier is a proper connection protocol certificate. Additionally, the authenticator 200 compares the nonce provided by the authenticator 300 to an expected nonce (e.g., the nonce currently on TOP of the session chain associated with the identifier of the resource involved in the session), and if they match, the authenticator 200 determines that the resource is authenticated. If the authentication fails, the session between the resource and the management device is terminated. In examples wherein the management device of FIG. 2 and the resource of FIG. 3 have not previously interacted (e.g., no previous sessions), authentication using the identifying credentials (e.g., the TLS certificate) is enough to claim the identity as an original resource and/or management device. In such examples, an agreed upon arbitrary value (e.g., 0) is used in lieu of a previously negotiated nonce.

After authentication, the random (or pseudo random) number generator 304 of the resource involved in the session generates a random (or pseudo random) number A. In some such examples, the nonce manager 302 of the resource involved in the session determines an ephemeral public key of the resource: $g^A$ mod p. In some examples, the ephemeral public key is a DH public key. In some such examples, the nonce manager 302 determines H(RID;$g^A$ mod p, TOP), where "RID" is an identifier of the resource involved in the session and "H(RID;$g^A$ mod p, TOP)" is a keyed hash function of (a) the ephemeral public key of the resource involved in the session and (b) the TOP of the session chain stack identified by the identifier of the resource involved in the session (e.g., RID). In some such examples, the communicator 308 of the resource involved in the session generates a first message including (RID, $g^A$ mod p, H(RID; $g^A$ mod p, TOP)). The example communicator 308 sends the first message to the example communicator 208 of the management device involved in the session and the example communicator 308 waits for a response.

The example communicator 208 of the management device involved in the session receives the first message including (RID, $g^A$ mod p, HVAL). The example nonce manager 202 of the management device involved in the session determines an expected nonce HTOP as H(RID;$g^A$ mod p, TOP), where TOP corresponds to the top of a session chain stack in the session chain database 206 corresponding to the RID. In some examples, the nonce manager 202 determines an expected nonce HPEEK as H(RID;$g^A$ mod p, PEEK)), where PEEK corresponds to the nonce directly beneath the top of the session chain stack in the session chain database 206 corresponding to the RID. The example nonce manager 202 determines whether HVAL (e.g., from the first message) is equal to HTOP (e.g., H(RID;$g^A$ mod p, TOP)) or HPEEK (e.g., H(RID;$g^A$ mod p, PEEK)), because HVAL is the resource's attempt to prove knowledge of the current nonce. If HVAL equals HTOP (e.g., H(RID;$g^A$ mod p, TOP)), then the example resource involved in the session is using the current nonce. If HVAL does not equal HTOP, but HVAL equals HPEEK (e.g., H(RID;$g^A$ mod p, PEEK)), then the example management device involved in the session has failed to commit the current nonce to the example session chain stack. If HVAL does not equal HTOP and HVAL does not equal HPEEK, then there is a nonce mismatch (e.g., the resource does not have the same nonce as the management device on TOP or in the PEEK of the resource session chain stack). In some such examples, the resource involved in the session is using a previous nonce and is likely a duplicate resource. The session between the example resource and the example management device is terminated if HVAL does not equal HTOP and HVAL does not equal HPEEK. In some examples, the resource involved in a session that is terminated may be given a new identity (e.g., a new identifier and/or a new nonce) for subsequent session with the management device, provided that the resource can authenticate (e.g., using a TLS certificate).

The random (or pseudo random) number generator 204 of the management device involved in the session generates a random (or pseudo random) value B to be used in responding to the first message. In some examples, the example communicator 208 of the management device involved in the session responds to the first message if HVAL equals HTOP (e.g., the nonces match). In such examples, the example communicator 208 of the management device involved in the session sends a response to the first message including (MID, $g^B$ mod p, H(MID;$g^B$ mod p, TOP)). The example nonce manager 202 of the management device involved in the session PUSHES (e.g., places in the stack over previous nonce) a new nonce H((($g^A$ mod p)$^B$ mod p), TOP) onto the example session chain stack corresponding to the RID in the session chain database 206. In such examples, this effectively makes H((($g^A$ mod p)$^B$ mod p), TOP) the current nonce, and the previous TOP nonce becomes the PEEK nonce.

In some examples, the example communicator 208 of the management device involved in the session responds to the first message when HVAL equals HPEEK. In such examples, the example communicator 208 sends a response to the first message including (MID, $g^B$ mod p, H(MID;$g^B$ mod p, PEEK)). The example nonce manager 202 of the management device involved in the session PUTS (e.g., replaces the value on TOP of stack with) a new nonce H((($g^A$ mod p)$^B$ mod p), PEEK) onto the example session chain stack in the session chain database 206 corresponding to the RID of the resource involved in the session.

The example communicator 308 of the resource involved in the session receives the response including an identifier (e.g., MID), an ephemeral public key of the management device involved in the session (e.g., $g^B$ mod p), and a value of a similar keyed hash function (e.g., (MID, $g^B$ mod p, HVAL)). The example nonce manager 302 of the resource involved in the session determines whether the value of the keyed hash function (e.g. HVAL) from the response equals H(MID;$g^B$ mod p, TOP), where "H(MID;$g^B$ mod p, TOP)" is a keyed hash function of (a) the ephemeral public key of the management device involved in the session and (b) the TOP of a session chain stack in the session chain database 306 identified by the identifier of that same management device (e.g., MID). If HVAL does not equal H(MID;$g^B$ mod p, TOP), then there is a nonce mismatch (e.g., the resource and/or the management device involved in the session do not have the same nonce on TOP of the respective session chain stacks), and the session between the resource and the management device is terminated. If HVAL equals H(MID;$g^B$ mod p, TOP), then the example nonce manager 302 pushes a new nonce H((($g^B$ mod p)$^A$ mod p), TOP) onto the example session chain stack in the session chain database 306 corresponding to the MID. As a result of the communication discussed above, the example resource involved in the session and the example management device involved in the session have negotiated (or re-negotiated) a new nonce.

As disclosed herein, ($g^A$ mod p)$^A$ mod p=($g^A$ mod p)$^B$ mod p. Further, H((($g^B$ mod p)$^A$ mod p), Old) H((($g^A$ mod p)$^B$ mod p), Old), whether "Old" is TOP or PEEK. Therefore, in examples where the nonce manager 302 PUSHES H((($g^B$ mod p)$^A$ mod p), TOP) onto the session chain stack in the session chain database 306 (FIG. 3) and the nonce manager 202 PUSHES H((($g^A$ mod p)$^B$ mod p), TOP) onto the session chain stack in the session chain database 206, these nonces (e.g., H((($g^B$ mod p)$^A$ mod p), TOP) and H((($g^A$ mod p)$^B$ mod p), TOP)) are the same.

The example communicator 308 of the resource involved in the session sends a second message to the example communicator 208 of the management device involved in the session including (RID, "commit", H(RID;"commit", TOP)). The example communicator 208 receives the second message from the example communicator 308. In some examples, the second message includes (RID, "commit", HVAL). The example nonce manager 202 of the management device involved in the session determines whether the value of the keyed hash function (e.g. HVAL) in the second message equals H(RID;"commit", TOP). If HVAL equals H(RID;"commit", TOP), then the second message is an instruction to commit the current state to memory. In some examples, the nonce manager 202 duplicates the TOP of the session chain stack in the session chain database 206 such that TOP==PEEK. In some examples, nonces are committed to the stack when the TOP of the stack is equal to the PEEK of the stack (e.g., after a DUP( ) instruction). In such examples, this two-stage commit process (e.g., duplication and verification) ensures that network disconnects during negotiation will not force expected nonces out of sync (e.g., the management device and the resource maintain a same expected nonce). Having negotiated (or re-negotiated) a new nonce (e.g., H((($g^A$ mod p)$^B$ mod p), TOP) or H((($g^A$ mod p)$^B$ mod p), PEEK)), the example communicator 208 of the management device involved in the session can now communication with the example communicator 308 of the resource involved in the session over an integrity protecting protocol, such as, for example, TLS. When the communications are complete, the session between the resource and the management device is terminated.

Figure 4A:
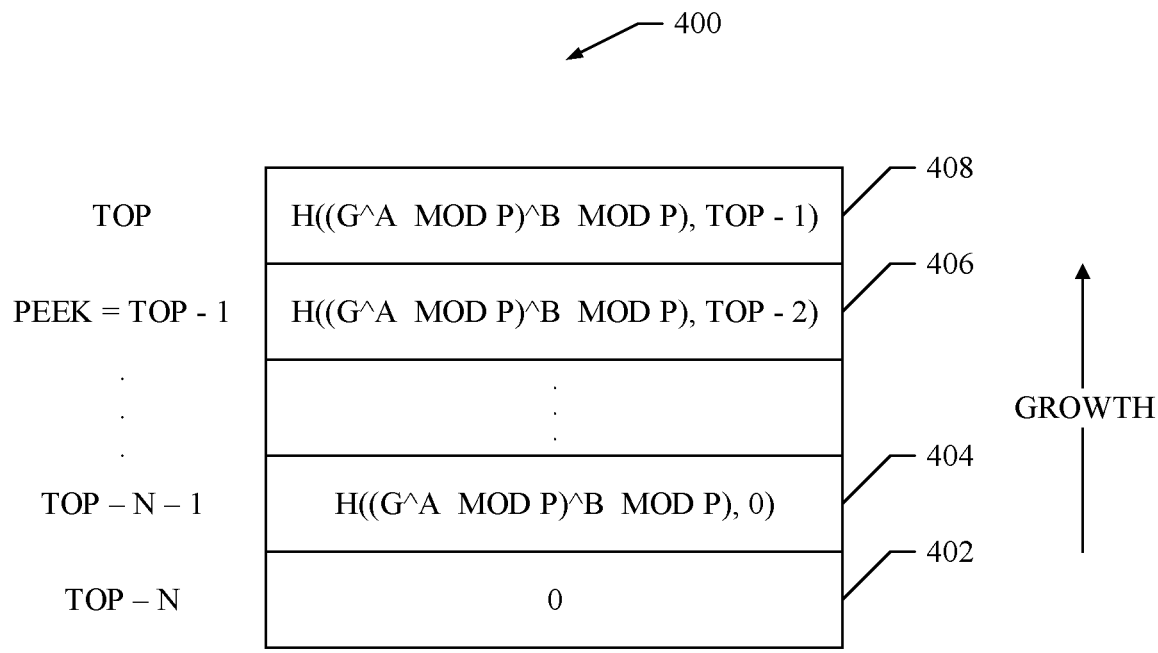
FIG. 4A is a block diagram illustrating an example implementation of a session chain stack stored within the example session chain database of the example management device of FIG. 2.

FIG. 4A illustrates an example implementation of an example session chain stack 400 (e.g., R1 stack 212) stored within the example session chain database 206 of FIG. 2. In a first session between a management device and a resource (e.g., no previous communications), any agreed upon nonce value may be used (e.g., "0") as a first nonce 402 in the example session chain stack 400. As described above, authentication credentials, such as, for example, an identifier (e.g., a TLS certificate) may be used with the initial agreed upon nonce value to authenticate a resource and/or management device during a first communication session between the resource and/or management device pair. In some examples, the agreed upon nonce value is pre-programmed within resources and/or management devices. In some examples, the agreed upon nonce value is determined based on one or more agreed upon standards documents.

However, as disclosed herein, for any subsequent session, a new nonce is negotiated between the corresponding management device and the corresponding resource based on the previous nonce. Therefore, a second nonce 404 (e.g., H((($g^A$ mod p)$^B$ mod p), 0)) is negotiated between the example nonce manager 202 of the management device involved in the session and the example nonce manager 302 of the resource involved in the session for a second session. A third nonce may be negotiated for a third session. In some examples, a new nonce may be negotiated during a session after a nonce has been previously negotiated. For example, if a duplicate resource attempts to authenticate with a management device that is currently involved in a session with an original resource, the management device identifies that two resources having the same identity (e.g., identifier and stack of nonces) exist and a new nonce needs to be renegotiated to distinguish such duplicate resources.

In some examples, the session chain stack 400 includes N+1 nonces. As disclosed herein, a PEEK nonce 406 corresponds to the nonce value below a TOP nonce 408 and is also based on the previous nonce (e.g., H((($g^A$ mod p)$^B$ mod p), TOP−2)). In such examples, the TOP nonce 408 is defined as (e.g., H((($g^A$ mod p)$^B$ mod p), PEEK)). In the illustrated example of FIG. 4A, the session chain stack 400 grows upwardly as new nonces are added or pushed onto the session chain stack 400.

Figure 4B:
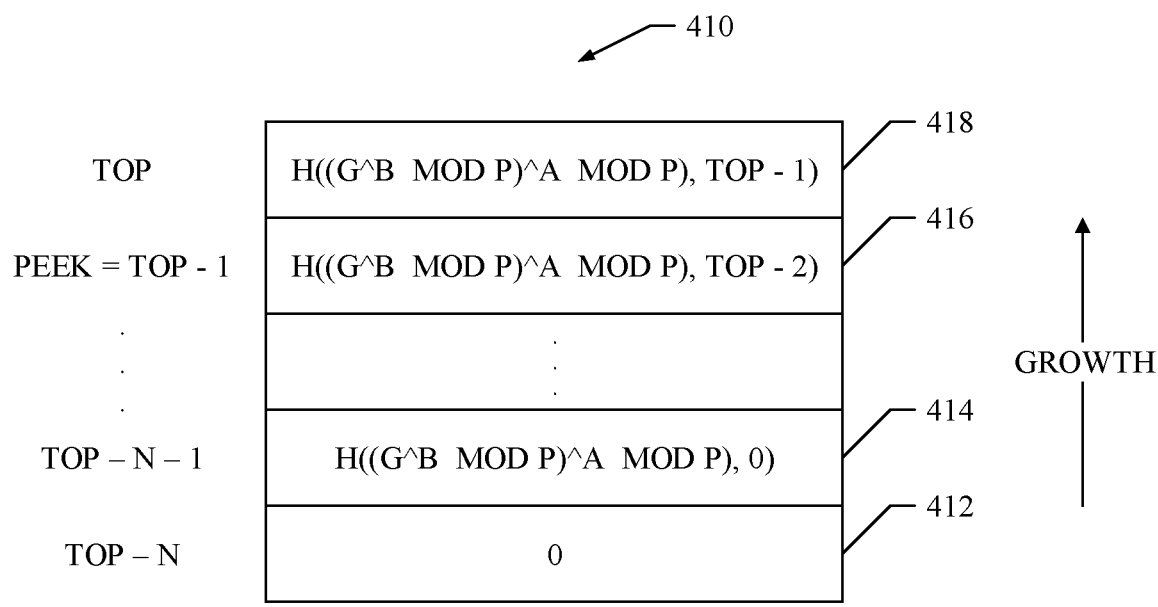
FIG. 4B is a block diagram illustrating an example implementation of a session chain stack stored within the example session chain database of the example resource of FIG. 3.

FIG. 4B illustrates an example implementation of an example session chain stack 410 (e.g., M1 stack 312) stored within the example session chain database 306 of FIG. 3. As described above, any agreed upon nonce value may be used (e.g., "0") as a first nonce 412 for a first session. However, as disclosed herein, for any subsequent session, a new nonce is negotiated between the corresponding management device and the corresponding resource based on the previous nonce. Therefore, a second nonce 414 is negotiated between the example nonce manager 302 and the example nonce manager 202 (e.g., H(((g$^B$ mod p)$^A$ mod p), 0)) for the second session. A third nonce may be negotiated for a third session, etc. In some examples, the session chain stack 410 includes N+1 nonces. As disclosed herein, a PEEK nonce 416 corresponds to the nonce value below a TOP nonce 418 and is also based on the previous nonce (e.g., H(((g$^B$ mod p)$^A$ mod p), TOP−2)). In such examples, the TOP nonce 418 is defined as (e.g., H(((g$^B$ mod p)$^A$ mod p), PEEK)). In the illustrated example of FIG. 4B, the session chain stack 410 grows upwardly as new nonces are added or pushed onto the session chain stack 410.

Figure 5:
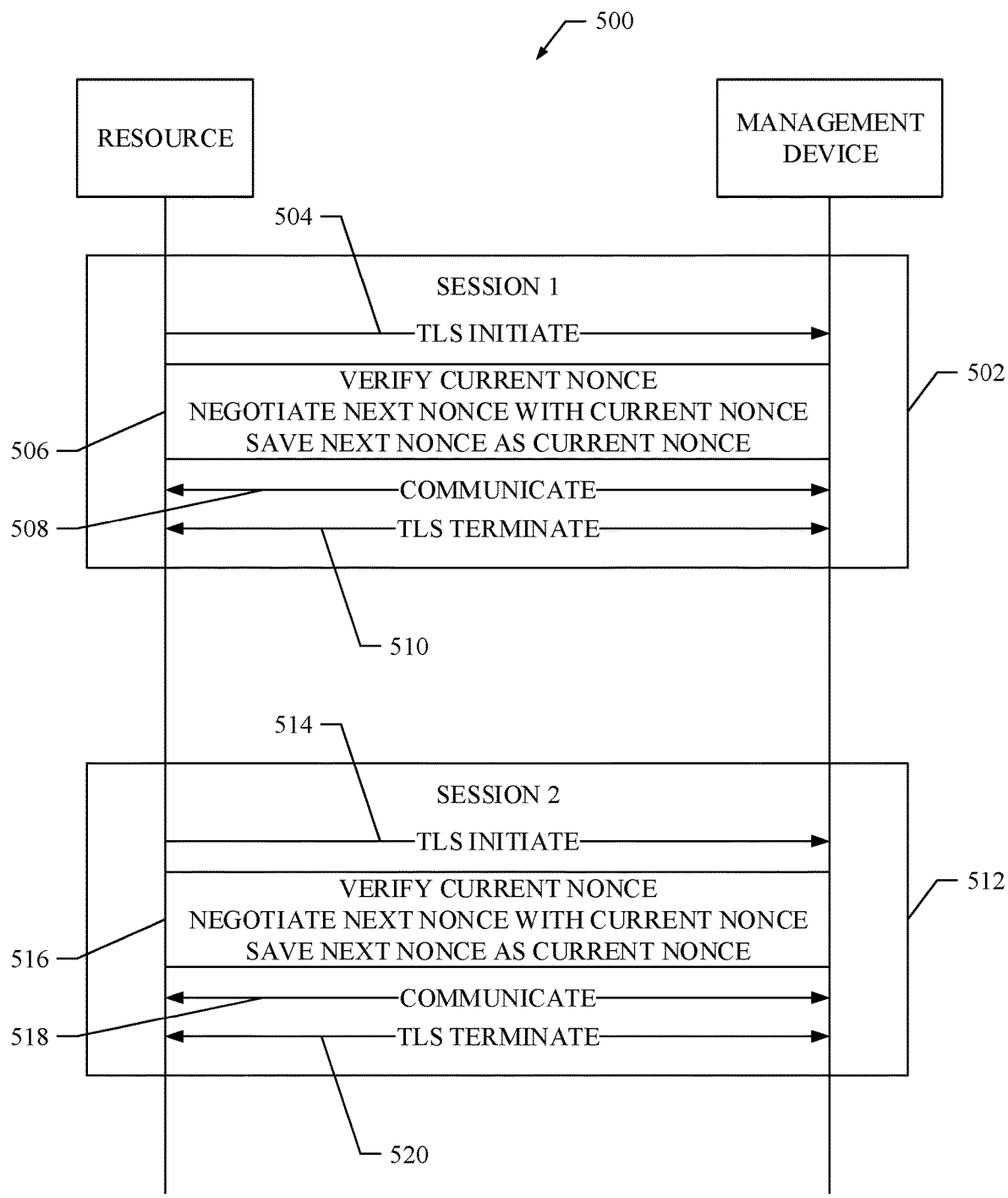
FIG. 5 is an example timing diagram illustrating communication between the example management device of FIG. 2 and the example resource of FIG. 3.

FIG. 5 is an example timing diagram 500 illustrating a series of communication sessions between an example management device (e.g., the management device of FIG. 2) and an example resource (e.g., the resource 1 108a of FIG. 3). A first session 502 is initiated by a session request 504 from the example resource. As disclosed herein, any number of resources with the correct credentials (e.g., TLS certificate and current nonce) can initiate the first session 502. Once a session between a resource and a management device has been initiated, all other session requests from resources presenting the same resource ID will be denied. In the illustrated example of FIG. 5, the session request 504 is a request to begin a session via TLS. In some examples, the resource authenticates via TLS with a certificate (e.g., cert1). Alternate protocols, such as, for example, Secure Sockets Layer ("SSL"), Secure Shell, Active Directory, Kerberos, etc. may be used instead of and/or in conjunction with TLS. Thereafter, the example management device involved in the first session updates the current nonce as indicated by reference numeral 506.

Specifically, the example management device involved in the first session verifies the current nonce of the example resource involved in the first session. In some examples, the authenticator 200 of the management device involved in the first session verifies the current nonce of the resource involved in the first session by comparing the current nonce sent with the session request 504 to an expected nonce (e.g., a nonce stored in the example session chain stack 400 associated with an identifier of the example resource involved in the first session). In some examples, the resource involved in the first session encrypts the session request 504 and/or data associated with the session request 504 with the current nonce. In such examples, the authenticator 200 of the management device involved in the first session attempts to decrypt the session request 504 and/or data associated with the session request 504 using the expected nonce as a decryption key. If the authenticator 200 successfully decrypts the session request 504 and/or data associated with the session request 504 using the expected nonce as the decryption key, then the authenticator 200 determines that the example resource involved in the first session is an original resource.

Once the authenticator 200 verifies the current nonce, the nonce manager 202 of the example management device involved in the first session 502 interacts with the nonce manager 302 of the example resource involved in the first session 502 to negotiate a next nonce and save the next nonce as the current nonce. As disclosed herein, saving the next nonce as the current nonce includes pushing the next nonce onto the TOP of the session chain stack (e.g., session chain stack 400) thereby making the nonce that was used in conjunction with the session request 504 an old (e.g., stale) nonce (e.g., located below the current nonce in the session chain stack). Thereafter, the example resource involved in the first session 502 and the example management device involved in the first session 502 can communicate as indicated by reference numeral 508 without renegotiating nonces. In some examples, the communication 508 does not require a new nonce to be negotiated for every message transmitted. In such examples, once the session request 504 has been verified and the next nonce is negotiated, communication 508 continues until the session (e.g., TLS) is terminated as indicated by reference numeral 510. In some examples, the resource involved in the first session 502 (e.g., resource 1 108a) and the management device involved in the first session 502 (e.g., management device 1 102) re-negotiate a next nonce prior to termination 510. As disclosed herein, the example resource involved in the first session 502 is thereby differentiated from other example resources (e.g., resources 108b, 108c, 108d) based on the nonce negotiated (or re-negotiated) during the first session 502.

In some examples, prior to a second session 512 initiating, the example resource involved in the first session 502 (e.g., resource 1 108a) is distinguishable from other example resources (e.g., resources 108b, 108c, 108d) unless the example resource in the first session 502 was replicated after the first session 502 and prior to the second session 512. If the example resource in the first session 502 was replicated after the first session 502 and prior to the second session 512, the first identical resource to initiate the second session 512 assumes the identity as the original resource. In such examples, a duplicate resource replicated after the first session 502 and prior to the second session 512 may act as if it was the resource involved in the first session 502.

The second session 512 is initiated by a session request 514 from the example resource involved in the first session 502 (or a duplicate assuming the identity of the resource involved in the first session 502) to the management device involved in the first session 502. In the illustrated example of FIG. 5, the session request 514 is a request to begin a session via TLS. In some examples, the resource involved in the first session 502 authenticates via TLS with the same certificate as in the first session 502 (e.g., cert1) to begin the second session 512. Thereafter, the example management device involved in the second session 512 updates the current nonce as indicated by reference numeral 516.

The example management device involved in the second session 512 verifies the current nonce of the example resource involved in the second session 512 (e.g., the nonce negotiated/re-negotiated during the first session 502). Once the authenticator 200 verifies the current nonce, the nonce manager 202 of the example management device involved in the second session 512 interacts with the nonce manager 302 of the example resource involved in the second session 512 to negotiate the next nonce and save the next nonce as the current nonce. Thereafter, the example resource involved in the second session 512 and the example management device involved in the second session 512 can communicate without negotiating nonces as indicated by reference numeral 518. In some examples, the communication 518 does not require a new nonce to be negotiated for every message transmitted. In such examples, once the session request 514 has been verified and the next nonce is negotiated, communication 518 continues until the session (e.g., TLS) is terminated as indicated by reference numeral 520. In some examples, the resource involved in the second session 512 and the management device involved in the second session 512 re-negotiate a next nonce prior to termination 520. As disclosed herein, the example resource involved in the second session 512 is thereby differentiated from resources duplicated after the first session 502 but before the second session 512 based on the nonce negotiated during the second session 512. Additionally, the example resource involved in the second session 512 is thereby differentiated from resources duplicated prior to the first session 502 based on a session chain including the nonce negotiated during the first session 502 and the nonce negotiated in the second session 512.

In some examples, the resource involved in a session must prove knowledge of a session chain stack (e.g., an entire stack or series of nonces). For example, after the second session 512, a resource that has been communicating with the corresponding management device for both sessions has at least two newly negotiated nonces in its session chain stack. In some examples, the identity of that resource is proven by proving the resource is the same resource as the one claiming the identity in all previous sessions.

In some examples, a resource may implement a management device as described herein. For example, instead of a resource being the sender and a management device being the receiver, the management device may be the sender and the resource may be the receiver. In such examples, the management device may send the session request 404 and the above disclosed timing diagram of FIG. 5 may be reversed. Additionally or alternatively, a first resource (e.g., resource 1 108a) may implement the management device with respect to a second resource (e.g., resource 2 108b). For example, instead of the first resource (e.g., resource 1 108a) being the sender and the management device (e.g., management device 1 102) being the receiver, the second resource (e.g., resource 2 108b) may be the sender and the first resource (e.g., resource 1 108a) may be the receiver. In such examples, the resources create a session between themselves as described above.

Figure 6A:
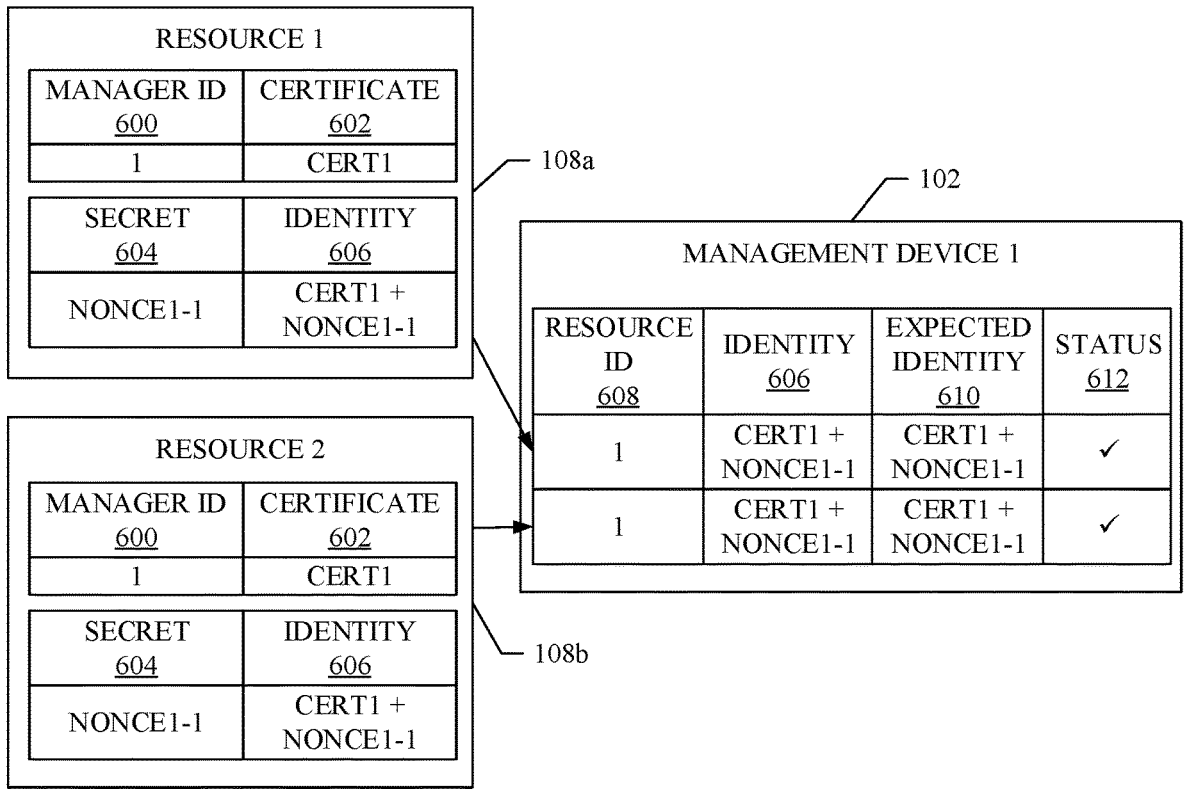
FIGS. 6A-6B are block diagrams illustrating differentiation of example identical resources using a number only used once ("nonce") by the example management device of FIG. 2.
Figure 6B:
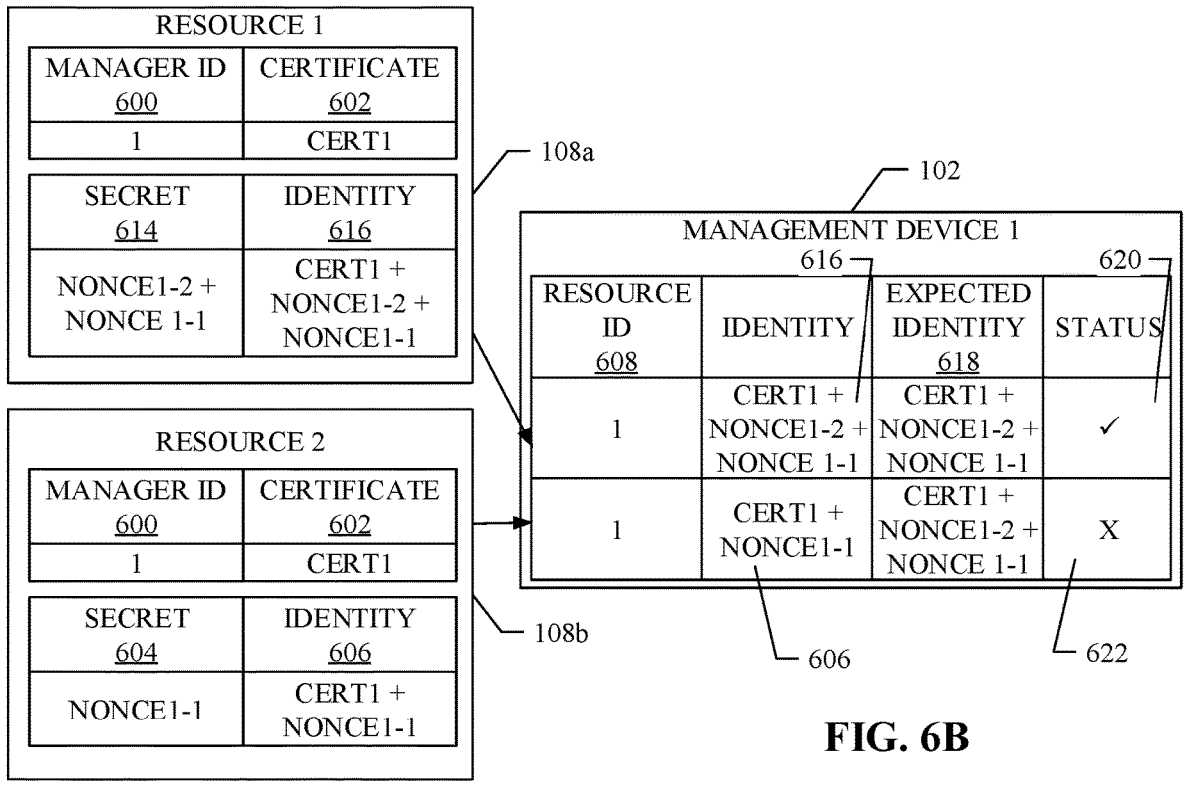

FIGS. 6A-6B are block diagrams illustrating an example in which the example management device of FIG. 2 differentiates identical resources. In the illustrated example of FIG. 6A, two resources (e.g., resource 1 108a and resource 2 108b) are attempting to connect with a management device (e.g., management device 1 102) as indicated in the manager ID field 600 (e.g., manager ID "1" indicates management device 1 102). In the illustrated example of FIG. 6A, the resources are the same (e.g., resource 2 108b is an identical replication of resource 1 108a). For example, both resources are associated with a same certificate 602 (e.g., cert1) and a same secret 604 (e.g., nonce1-1). Either resource can authenticate with the example management device to claim the identity as the original resource because both resources are associated with a same identity 606 (e.g., a combination of the certificate 602 and the secret 604). In the illustrated example of FIG. 6A, the management device uses a resource ID 608 (e.g., "1") of a first resource (e.g., resource 1 108a) to locate an expected identity 610 (e.g., the combination of the certificate 602 and secret 604) for the first resource. Notably, the example management device locates the same expected identity 610 for a second resource (e.g., resource 2 108b) because the second resource replicated the resource ID 608. In the illustrated example of FIG. 6A, a status 612 indicates whether the identity 606 (e.g., cert1+nonce1-1) of the resource matches the expected identity 610 (e.g., cert1+nonce1-1) that the management device has previously associated with the resource ID 608 (e.g., "✓" indicates a match; "X" indicates no match). When both resources have identities that match the expected identity, either resource can authenticate with the example management device to start a session.

As disclosed herein, once one of example resources authenticates with the example management device, the authenticated resource and the example management device negotiate a new secret. In the illustrated example of FIG. 6B, it is assumed that example resource 1 108a authenticated with the example management device 1 102 first and negotiated a new nonce (e.g., nonce1-2). In the illustrated example, the resource 1 108a has a new secret 614, which is a session chain stack including the new nonce (e.g., nonce1-2) and the previous nonce (e.g., e.g., nonce1-1). As disclosed herein, the resource and management device involved in the negotiation associate the new nonce with respective session chain stacks. For example, the example resource stores the secret 614 in association with the manager ID 600 and the example management device stores the secret 614 in association with the resource ID 608. In some examples, the example resource adds the new nonce (e.g., nonce 1-2) to the identity 606 to create a new identity 616. In some examples, the example management device adds the new nonce (e.g., nonce 1-2) to the expected identity 610 to create a new expected identity 618.

FIG. 6B illustrates example resource 1 108a and example resource 2 108b after the new nonce has been negotiated (or re-negotiated). In the illustrated example of FIG. 6B, resource 2 108b is no longer an identical replication of resource 1 108a. For example, resource 1 108a is associated with the certificate 602 (e.g., cert1) and the secret 614 (e.g., nonce1-2+nonce1-2), and thus, the new identity 616 (e.g., cert1+nonce1-2+nonce1-1, corresponding to a chain of sessions defined by the secret 614 and secret 604 within a session chain stack associated with resource 1 108a). However, resource 2 108b is associated with the certificate 602 (e.g., cert1) and the secret 604 (e.g., nonce1-1), and thus, the identity 606 (e.g., cert1+nonce1-1). In the illustrated example of FIG. 6B, the management device 1 102 uses the resource ID 608 (e.g., "1") of the first resource (e.g., resource 1 108a) to locate the new expected identity 618 (e.g., the combination of the expected identity 610 and the new nonce nonce1-2) for the first resource. The example management device 1 102 uses the resource ID 608 (e.g., "1") of the second resource (e.g., resource 2 108b) to locate the new expected identity 618 (e.g., the combination of the expected identity 610 and the new nonce nonce1-2) for the second resource.

In the illustrated example of FIG. 6B, the new identity 616 of the first resource matches with the new expected identity 618 that the management device 1 102 associates with the resource ID 608. In the illustrated example of FIG. 6B, a status 620 (e.g., "✓") indicates that the new identity 616 (e.g., cert1+nonce1-2+nonce1-1) of the first resource matches the new expected identity 618 (e.g., cert1+nonce1-2+nonce1-1) that the management device associates with the resource ID 608. A status 622 (e.g., "X") indicates that the identity 606 (e.g., cert1+nonce1-1) of the second resource does not match the new expected identity 618 (e.g., cert1+nonce1-2+nonce1-1) that the management device associates with the resource ID 608.

Accordingly, the management device can distinguish resource 1 108a from resource 2 108b by the new secret 614 (e.g., nonce1-2 on TOP of the session chain stack associated with resource 1 108a). Therefore, if resource 1 108a would be restored from resource 2 108b, the restored resource 1 108a would not include the secret 614, and the management device 1 102 would not identify it as the resource from the previous session. However, in some examples, resource 2 108b replicates resource 1 108a after the negotiation of the new secret 614 (e.g., nonce1-2). In such examples, the above process repeats because either resource 1 108a or resource 2 108b can authenticate again as an original resource for a subsequent session.

While an example manner of implementing the example management device 1 102 of FIG. 1 is illustrated in FIG. 2, one or more of the elements, processes and/or devices illustrated in FIG. 2 may be combined, divided, re-arranged, omitted, eliminated and/or implemented in any other way. Further, the example authenticator 200, the example nonce manager 202, the example random (or pseudo random) number generator 204, the example session chain database 206, the example communicator 208, the example bus 210 and/or, more generally, the example management device 1 102 of FIG. 2 may be implemented by hardware, software, firmware and/or any combination of hardware, software and/or firmware. Thus, for example, any of the example authenticator 200, the example nonce manager 202, the example random (or pseudo random) number generator 204, the example session chain database 206, the example communicator 208, the example bus 210 and/or, more generally, the example management device 1 102 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example authenticator 200, the example nonce manager 202, the example random (or pseudo random) number generator 204, the example session chain database 206, the example communicator 208, or the example bus 210 is/are hereby expressly defined to include a tangible computer readable storage device or storage disk such as a memory, a digital versatile disk (DVD), a compact disk (CD), a Blu-ray disk, etc. storing the software and/or firmware. Further still, the example management device 1 102 of FIG. 1 may include one or more elements, processes and/or devices in addition to, or instead of, those illustrated in FIG. 2, and/or may include more than one of any or all of the illustrated elements, processes and devices.

Figure 7:
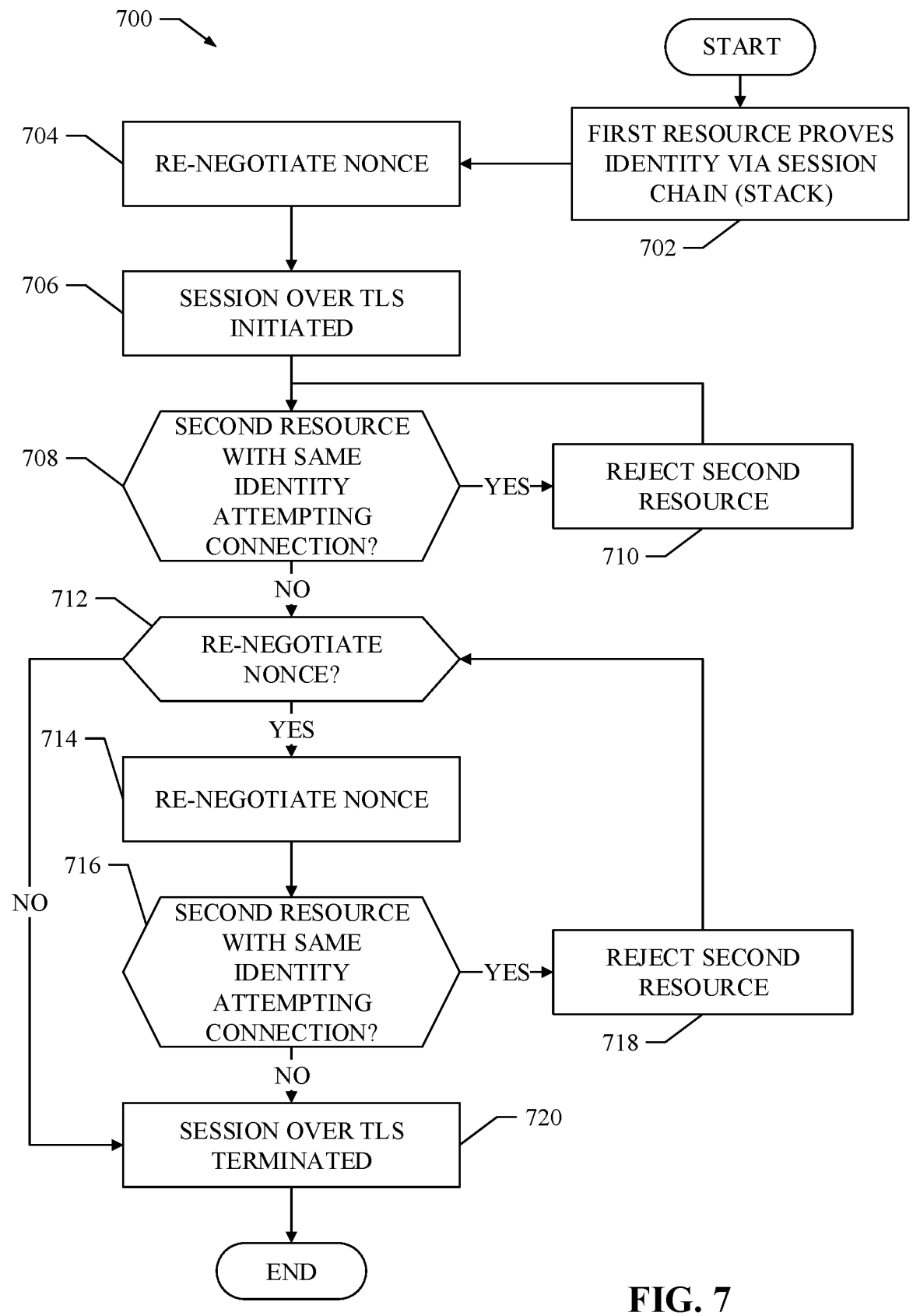
FIG. 7 is a flowchart illustrating an example implementation of the example management device of FIG. 2 and the example resource for FIG. 3.
Figure 9:
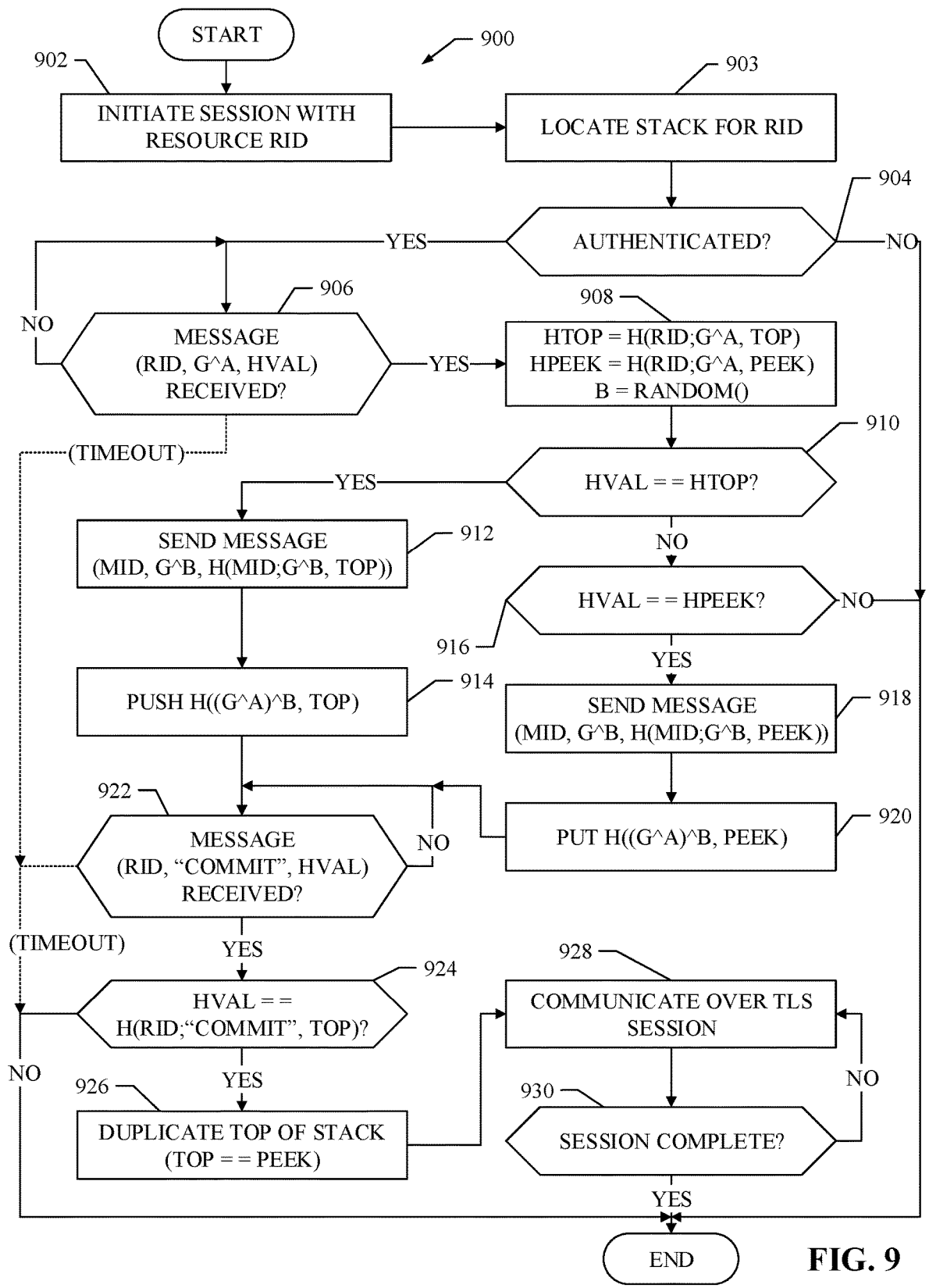
FIG. 9 is a flowchart illustrating an example implementation of the example management device of FIG. 2 initiating a session with the example resource of FIG. 3.

Flowcharts representative of example machine readable instructions for implementing the example management device 1 102 of FIG. 2 are shown in FIGS. 7 & 9. In these example, the machine readable instructions comprise programs for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example programs are described with reference to the flowcharts illustrated in FIGS. 7 & 9, many other methods of implementing the example management device 1 102 may alternatively be used. For example, the order of execution of the blocks may be changed, and/or some of the blocks described may be changed, eliminated, or combined.

While an example manner of implementing the example resource 1 108a of FIG. 1 is illustrated in FIG. 3, one or more of the elements, processes and/or devices illustrated in FIG. 3 may be combined, divided, re-arranged, omitted, eliminated and/or implemented in any other way. Further, the example authenticator 300, the example nonce manager 302, the example random (or pseudo random) number generator 304, the example session chain database 306, the example communicator 308, the example bus 310, and/or, more generally, the example resource 1 108a of FIG. 3 may be implemented by hardware, software, firmware and/or any combination of hardware, software and/or firmware. Thus, for example, any of the example authenticator 300, the example nonce manager 302, the example random (or pseudo random) number generator 304, the example session chain database 306, the example communicator 308, the example bus 310, and/or, more generally, the example resource 1 108a could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example authenticator 300, the example nonce manager 302, the example random (or pseudo random) number generator 304, the example session chain database 306, the example communicator 308, or the example bus 310 is/are hereby expressly defined to include a tangible computer readable storage device or storage disk such as a memory, a digital versatile disk (DVD), a compact disk (CD), a Blu-ray disk, etc. storing the software and/or firmware. Further still, the example resource 1 108a of FIG. 1 may include one or more elements, processes and/or devices in addition to, or instead of, those illustrated in FIG. 3, and/or may include more than one of any or all of the illustrated elements, processes and devices.

Figure 8:
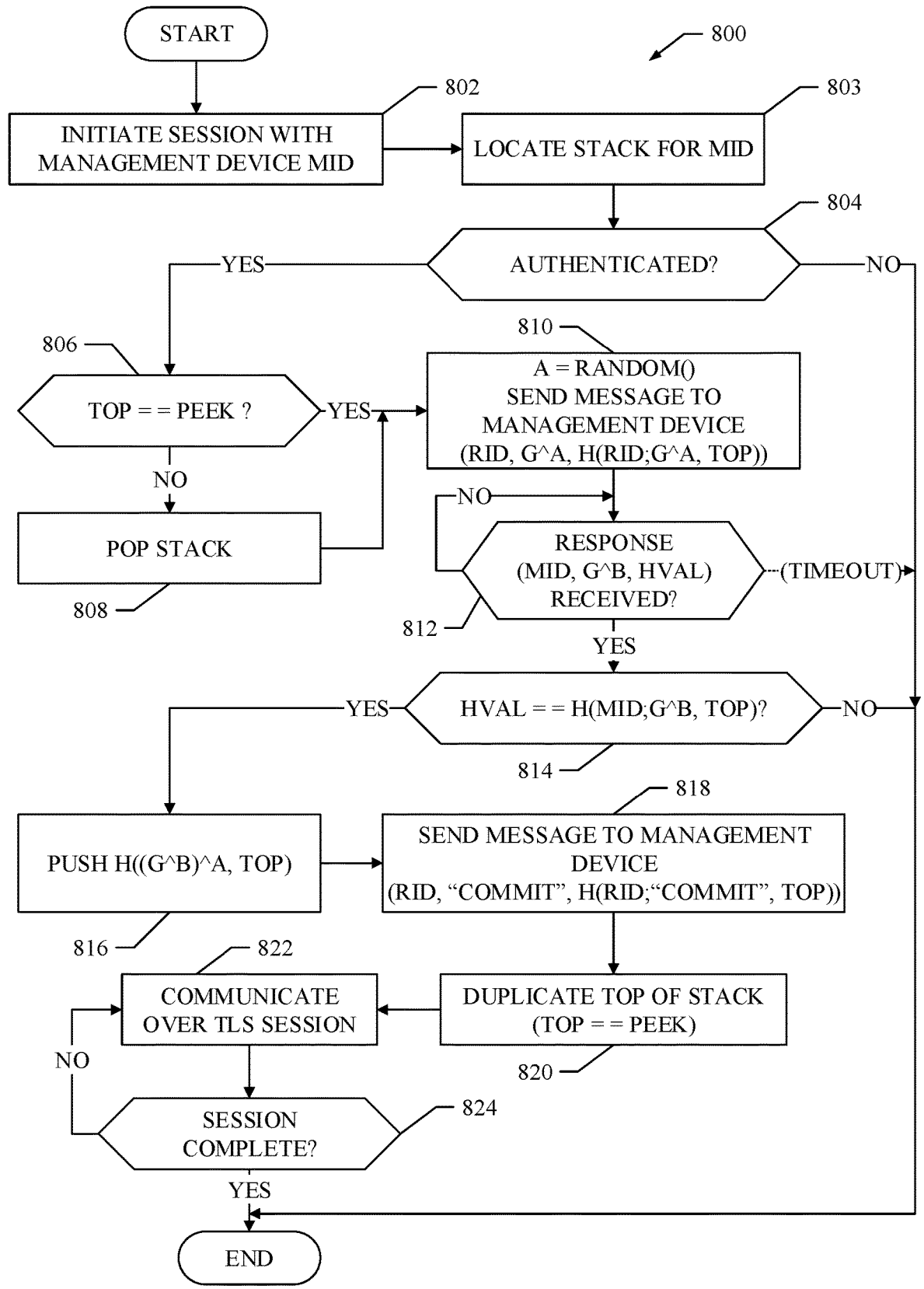
FIG. 8 is a flowchart illustrating an example implementation of the example resource of FIG. 3 initiating a session with the example management device of FIG. 2.

A flowchart representative of example machine readable instructions for implementing the example resource 1 108a of FIG. 3 is shown in FIG. 8. In this example, the machine readable instructions comprise a program for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 4, many other methods of implementing the example resource 1 108a of FIG. 3 may alternatively be used. For example, the order of execution of the blocks may be changed, and/or some of the blocks described may be changed, eliminated, or combined.

As mentioned above, the example processes of FIGS. 7-9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 7-9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

FIG. 7 is a flowchart illustrating an example implementation of any of the example management devices of FIGS. 1 and 2 and any of the example resources of FIGS. 1 and 3. Example instructions 700 begin at block 702. At block 702, an example resource (e.g., resource 1 108a) proves its identity (e.g., provides the correct credentials) as an original resource (e.g., not a duplicate) via an example session chain stack (e.g., session chain stack 410) stored within the session chain database 306 to an example management device (e.g., example management device 1 102). As disclosed herein, the first resource (e.g., example resource 108a, 108b, 108c, 108d, etc.) to prove its identity can authenticate with the example management device. As disclosed herein, proving an identity requires (a) the example authenticator 300 of the example resource to authenticate over an integrity protecting protocol (e.g., TLS) with the example authenticator 200 of the example management device and (b) the example authenticator 300 of the example resource to prove to the example authenticator 200 of the example management device, knowledge of the current nonce and all previous nonces. The example nonce manager 304 of the example resource and the example nonce manager 204 of the example management device re-negotiate the current nonce after the example authenticator 300 of the example resource proves its identity (block 704). Thereafter, the example communicator 208 of the example management device initiates the session over the integrity protecting protocol (e.g., TLS) with the example communicator 308 of the example resource (block 706).

During the session, a second resource can attempt to prove its identity as the original resource (block 708). In some examples, the second resource (e.g., resource 2 108b) was a duplicate of resource involved in the session prior to that resource re-negotiating the current nonce. In such examples, the second resource attempts to use the previous nonce to prove its identity as the original resource. In some examples, the second resource replicates the resource involved in the session after that resource re-negotiated the current nonce. In such examples, the second resource attempts to use the current nonce to prove its identity as the original resource. In such examples, if a second resource presenting the same ID attempts to connect during the session (block 708: YES), the example communicator 208 of the example management device involved in the session rejects the session attempt of the second resource (block 710). The example management device involved in the session is currently in communicating with a resource that has proven its identity as the original resource, so the example communicator 208 of determines that any resource attempting to prove its identity as original resource is a forgery (e.g., copy, duplicate, etc.). Control returns to block 708.

If a second resource does not attempt to connect during the session (block 708: NO), control proceeds to block 712. At block 712, the example nonce manager 304 of the example resource involved in the session and the example nonce manager 204 of the example management device involved in the session determine whether to re-negotiate the current nonce. For example, if the second resource replicates the resource involved in the session after the resource involved in the session re-negotiated the current nonce at block 704, then the current nonce would not distinguish the second resource from the resource involved in the session after the session ends. In such examples, the example nonce manager 204 of the example management device involved in the session determines to re-negotiate the current nonce to differentiate the second resource. If the example nonce manager 304 of the example resource involved in the session and the example nonce manager 204 of the example management device involved in the session determine to re-negotiate the current nonce (block 712: YES), control proceeds to block 714. At block 714, the example nonce manager 304 of the example resource involved in the session and the example nonce manager 204 of the example management device involved in the session re-negotiate the current nonce and control proceeds to block 716. At block 716, the example communicator 208 of the example management device involved in the session determines whether a second resource attempts to connect with the example communicator 208. In such examples, if a second resource presenting the same ID attempts to connect during the session (block 716: YES), the example communicator 208 of the example management device involved in the session rejects the second resource (block 718) and control returns to block 712.

If the example nonce manager 304 of the example resource involved in the session and the example nonce manager 204 of the example management device involved in the session determine not to re-negotiate the current nonce (block 712: NO), or if a second resource does not attempt to connect during the session after nonce re-negotiation in block 714 (block 716: NO), control proceeds to block 720. At block 720, the session between the resource and the management device is terminated. Thereafter, the example instructions 700 cease operation.

FIG. 8 is a flowchart illustrating an example implementation of an example resource initiating a session with an example management device. As used in connection with FIG. 8, G^A is used as an abbreviation for g to the power of A modulo p (e.g., $g^A$ mod p), GAB is used as an abbreviation for g to the power of B modulo p (e.g., $g^B$ mod p), and (G^B)^A is used as an abbreviation for (g to the power of B modulo p) to the power of A modulo p (e.g., $(g^B \bmod p)^A$ mod p). Example instructions 800 begin at block 802. At block 802, the example communicator 308 of the example resource of FIG. 3 contacts the example communicator 208 of the example management device of FIG. 2. The example authenticator 300 of the example resource provides credentials, such as, for example, an identifier (e.g., a TLS certificate) and/or a nonce (e.g., a TOP nonce in a session chain stack associated with the example the example management device and stored within the session chain database 306 of the resource, such as, for example, M1 stack 312), to the example authenticator 200 of the example management device. Because a resource may initiate sessions with multiple management devices, the authenticator 300 locates, within the session chain database 306, nonces in a session chain stack associated with the corresponding management device based on the identifier of the management device (e.g., MID) (block 803). The example authenticator 200 initiates a session between the example communicator 308 and the example communicator 208 when the identifier is a correct credential for connecting (e.g., TLS protocol authentication). The example authenticator 200 determines whether the example authenticator 300 provided the correct nonce (e.g., is authenticated) (block 804). In some examples, the authenticator 200 compares the nonce provided by the authenticator 300 to an expected nonce (e.g., the current nonce at the TOP of the session chain stack associated with the resource involved in the session and stored within the session chain database 206 of the management device involved in the session, such as, for example, R1 stack 212), and if they match, the authenticator 200 determines the resource involved in the session is authenticated. If the authenticator 200 determines the resource involved in the session is authenticated (block 804: YES), then control proceeds to block 806. Otherwise (block 804: NO), the example instructions 800 cease operation and the session between the resource and the management device is terminated.

At block 806, the example nonce manager 302 of the example resource involved in the session determines whether the TOP of the example session chain stack associated with the example management device involved in the session and stored within the session chain database 306 of the resource involved in the session (e.g., the TOP of M1 stack 312) is equal to the PEEK (e.g., the nonce below the TOP nonce) of the example session chain stack associated with the example resource involved in the session and stored within the session chain database 206 of the management device involved in the session (e.g., TOP of M1 stack 312==PEEK of R1 stack 212). If the TOP of the example session chain stack associated with the example management device involved in the session does not equal the PEEK of the example session chain stack associated with the example resource involved in the session (block 806: NO), then control proceeds to block 808.

As disclosed herein, both the resource and the management device involved in the session duplicate recently negotiated nonces, such that the TOP and PEEK of each respective session chain stack is the same, unless an error (e.g., network issue, timeout, etc.) occurs prior to/during the commit phase. Thus, when the TOP of the example session chain stack associated with the example management device involved in the session and stored within the session chain database 306 of the resource involved in the session (e.g., the TOP of M1 stack 312) does not equal the PEEK of the example session chain stack associated with the example resource involved in the session and stored within the session chain database 206 of the management device involved in the session (e.g., TOP of M1 stack 312 !=PEEK of R1 stack 212), the example resource involved in the session determines that the example management device involved in the session did not commit the most recently negotiated nonce. At block 808, the example nonce manager 302 POPS the example session chain stack associated with the example management device involved in the session and stored within the session chain database 306 of the resource involved in the session, removing and returning the TOP value of the example session chain stack. Control proceeds to block 810.

If the TOP of the example session chain stack associated with the management device involved in the session and stored within the session chain database 306 of the resource involved in the session is equal to the PEEK of the example session chain stack (block 806: YES), then control proceeds to block 810. At block 810, the random (or pseudo random) number generator 304 the resource involved in the session generates a random (or pseudo random) number A. In some examples, the example communicator 308 of the resource involved in the session sends a first message (e.g., (RID, $g^A$ mod p, H(RID;$g^A$ mod p, TOP))) to the example communicator 208 of the management device involved in the session. In some such examples, the nonce manager 302 determines $g^A$ mod p, where "$g^A$ mod p" is an ephemeral public key of the resource involved in the session. In some such examples, the nonce manager 302 determines H(RID;$g^A$ mod p, TOP), where "RID" is an identifier of the resource involved in the session. In some such examples, the nonce manager 302 generates the first message including (RID, $g^A$ mod p, H(RID;$g^A$ mod p, TOP)), where "H(RID;$g^A$ mod p, TOP)" is a keyed hash function of (a) the ephemeral public key of the resource involved in the session and (b) the TOP of the session chain stack identified by the identifier of the resource involved in the session.

The example communicator 308 waits for a response to the first message from the example communicator 208 (block 812). In some examples, the response includes an identifier and an ephemeral public key of the management device involved in the session, and a value of a similar keyed hash function HVAL. If the example communicator 308 does not receive a response (block 812: NO), control loops back to block 812. The example communicator 308 can wait for a response continuously or, alternatively, can wait a threshold amount of time before the session between the resource and the management device is terminated (e.g., a timeout). When the first response is received (block 812: YES), the example nonce manager 302 determines whether the value of the keyed hash function HVAL in the first response equals H(MID;$g^B$ mod p, TOP), where "MID" is an identifier of the management device involved in the session, "$g^B$ mod p" is an ephemeral public key of the management device involved in the session, and "H(MID;$g^B$ mod p, TOP)" is a keyed hash function of (a) the ephemeral public key of the management device involved in the session and (b) the TOP of the session chain stack identified by the identifier of the management device involved in the session (block 814). If HVAL does not equal H(MID;$g^B$ mod p, TOP) (block 814: NO), then there is a nonce mismatch (e.g., the resource and/or the management device do not have the same nonce on TOP of the respective session chain stacks), the example instructions 800 cease operation, and the session between the resource and the management device is terminated. If HVAL equals H(MID;$g^B$ mod p, TOP) (block 814: YES), then the example nonce manager 302 PUSHES H((($g^B$ mod p)$^A$ mod p), TOP) onto the example session chain stack associated with the resource involved in the session (block 816). As disclosed above, the example resource involved in the session and the example management device involved in the session have negotiated (or re-negotiated) a new nonce N=H((($g^B$ mod p)$^A$ mod p), TOP), and control proceeds to block 818.

At block 818, the example communicator 308 sends a second message to the example communicator 208. In some examples, the second message includes (RID, "commit", H(RID;"commit", TOP)). In such examples, this message instructs the committing of the current state to memory. Thereafter, the example nonce manager 302 duplicates the TOP of the session chain stack associated with the resource involved in the session such that TOP==PEEK (block 820). Having negotiated (or re-negotiated) a new nonce (e.g., H((($g^B$ mod p)$^A$ mod p), TOP)), the example communicator 308 initiates a session with the example communicator 208 where communications occur over an integrity protecting protocol, such as, for example, TLS (block 822). At block 824, the example communicator 308 determines whether the session is complete. If not (block 824: NO), control returns to block 822. If the session is complete (block 824: YES), the example instructions 800 cease operation and the session between the resource involved in the session and the example management device is terminated.

FIG. 9 is a flowchart illustrating an example implementation of an example management device initiating a session with an example resource. As used in connection with FIG. 9, G^A is used as an abbreviation for g to the power of A modulo p (e.g., $g^A$ mod p), GAB is used as an abbreviation for g to the power of B modulo p (e.g., $g^B$ mod p), and (G^A)^B is used as an abbreviation for (g to the power of A modulo p) to the power of B modulo p (e.g., ($g^A$ mod p)$^B$ mod p). Example instructions 900 begin at block 902. At block 902, the example communicator 208 of the example management device of FIG. 2 accepts a session request from the example communicator 308 of the example resource of FIG. 3 to initiate a session. The example authenticator 200 of the example management device involved in the session receives credentials, such as, for example, an identifier (e.g., a TLS certificate) and/or a nonce, from the example authenticator 300 of the example resource involved in the session. In some examples, the authenticator 200 locates nonces in the session chain stack associated with the example resource involved in the session based on the identifier (e.g., RID) (block 903). The example authenticator 200 determines whether the example authenticator 300 has the correct credentials for authentication (block 904). In some examples, the authenticator 200 compares the nonce from the authenticator 300 to an expected nonce (e.g., the nonce currently on TOP of the session chain stack associated with the example resource involved in the session and stored within the session chain database 206 of the example management device involved the session, such as, for example, R1 stack 212), and if they match, the authenticator 200 determines the resource involved in the session is authenticated. In some examples, the authenticator 200 determines if the identifier is authentic and if the nonce from the authenticator 300 matches the expected nonce. If the authenticator 200 determines the resource involved in the session is authenticated (block 904: YES), then control proceeds to block 906. Otherwise (block 904: NO), the example instructions 900 cease operation and the session between the resource and the management device is terminated.

At block 906, the example communicator 208 waits for the first message from the example communicator 308. If the example communicator 208 receives the first message including (RID, $g^A$ mod p, HVAL) (block 906: YES), control proceeds to block 908. Otherwise (block 906: NO), control loops back to block 906. The example communicator 208 can wait for the first message continuously or, alternatively, can wait a threshold amount of time before the session between the resource and the management device is terminated (e.g., a timeout). At block 908, the example nonce manager 202 and the example random (or pseudo random) number generator 204 of the example management device involved in the session generates variables. For example, the example nonce manager 202 generates HTOP as H(RID;$g^A$ mod p, TOP) and HPEEK as H(RID;$g^A$ mod p, PEEK)), where TOP and PEEK refer to corresponding locations of the session chain stack associated with the identifier of the resource involved in the session (e.g., RID) and stored in the example session chain database 206 of the management device involved in the session (e.g., R1 stack 212). In some examples, the random (or pseudo random) number generator 204 generates a random (or pseudo random) value B.

The example nonce manager 202 determines whether HVAL received from the example resource involved in the session equals HTOP (e.g., H(RID;$g^A$ mod p, TOP)) because HVAL is the resource's attempt to prove knowledge of the nonce (block 910). If HVAL equals HTOP (e.g., H(RID;$g^A$ mod p, TOP)) (block 910: YES), then the example resource involved in the session is using the current nonce and control proceeds to block 912. At block 912, the example communicator 208 sends a response to the first message including (MID, $g^B$ mod p, H(MID;$g^B$ mod p, TOP)). The example nonce manager 202 PUSHES (e.g., places over the previous nonce) H((($g^A$ mod p)$^B$ mod p), TOP) onto the example session chain stack 400 (block 914). In such examples, this effectively makes H((($g^A$ mod p)$^B$ mod p), TOP) the current nonce, and the previous TOP nonce becomes the PEEK nonce. If HVAL does not equal HTOP (e.g., H(RID;$g^A$ mod p, TOP)) (block 910: NO), control proceeds to block 916. At block 916, the example nonce manager 202 determines whether HVAL equals HPEEK (e.g., H(RID;$g^A$ mod p, PEEK)). If HVAL does not equal HPEEK (e.g., H(RID;$g^A$ mod p, PEEK)) (block 916: NO), then there is a nonce mismatch (e.g., the resource involved in the session does not have the same nonce as the management device involved in the session), the example instructions 900 cease operation, and the session between the resource and the management device is terminated.

If HVAL equals HPEEK (e.g., H(RID;$g^A$ mod p, PEEK)) (block 916: YES), then control proceeds to block 918. At block 918, the example communicator 208 sends a response to the first message including (MID, $g^B$ mod p, H(MID;$g^B$ mod p, PEEK)). Thereafter, the example nonce manager 202 PUTS (e.g., replaces value on TOP of stack with) H((($g^A$ mod p)$^B$ mod p), PEEK) onto the example session chain stack associated with the management device involved in the session (block 920). In some examples, HVAL equaling HPEEK is indicative that a previous attempt to renegotiate a new nonce failed prior to the commit phase. In some such examples, the PUT function is used instead of the PUSH function and the new nonce is derived from PEEK instead of TOP to correct the previous failed attempt to renegotiate a new nonce.

As disclosed herein, ($g^A$ mod p)$^A$ mod p==($g^A$ mod p)$^B$ mod p. Further, H((($g^B$ mod p)$^A$ mod p), Old) H((($g^A$ mod p)$^B$ mod p), Old), whether "old" is TOP or PEEK. Therefore, while the example nonce manager 302 (FIG. 3) PUSHES H((($g^B$ mod p)$^A$ mod p), TOP) onto the example session chain stack (e.g., M1 stack 312/session chain stack 410) associated with the management device involved in the session and stored in the session chain database 306 of the resource involved in the session at block 816 (FIG. 8), and the example nonce manager 202 (FIG. 2) PUSHES H((($g^A$ mod p)$^B$ mod p), TOP) onto the example session chain stack (e.g., R1 stack 212/session chain stack 400) associated with the resource involved in the session and stored in the session chain database 206 of the management device involved in the session at block 914 (FIG. 9), these nonces (e.g., $H(((g^B \bmod p)^A \bmod p), TOP)$ and $H(((g^A \bmod p)^B \bmod p))$ are the same.

After block 914 or after block 920, control proceeds to block 922. At block 922, the example communicator 208 waits for the second message from the example communicator 308. In some examples, the second message includes (RID, "commit", HVAL). If the example communicator 208 does not receive the second message (block 922: NO), control loops back to block 922. The example communicator 208 can wait for a response continuously or, alternatively, can wait a threshold amount of time before the session between the resource and the management device is terminated (e.g., a timeout). When the second message is received (block 922: YES), the example nonce manager 202 determines whether the value of the keyed hash function HVAL in the second message equals H(RID;"commit", TOP) (block 924). If HVAL does not equal H(RID;"commit", TOP) (block 924: NO), then an error has occurred and the example instructions 900 cease operation. If HVAL equals H(RID;"commit", TOP) (block 924: YES), control proceeds to block 926. In such examples, the second message instructs the committing of the current state to memory. Thereafter, the example nonce manager 202 duplicates the TOP of the session chain stack 400 such that TOP==PEEK (block 926).

Having negotiated (or re-negotiated) a new nonce (e.g., $H(((g^A \bmod p)^B \bmod p), TOP)$ or $H(((g^A \bmod p)^B \bmod p), PEEK))$, the example communicator 208 initiates communications with the example communicator 308 where communications can occur over an integrity protecting protocol, such as, for example, TLS (block 928). At block 930, the example communicator 208 determines whether the session is complete. If not (block 930: NO), control returns to block 928. If the session is complete (block 930: YES), the example instructions 900 cease operation and the session between the resource and the management device is terminated.

Figure 10:
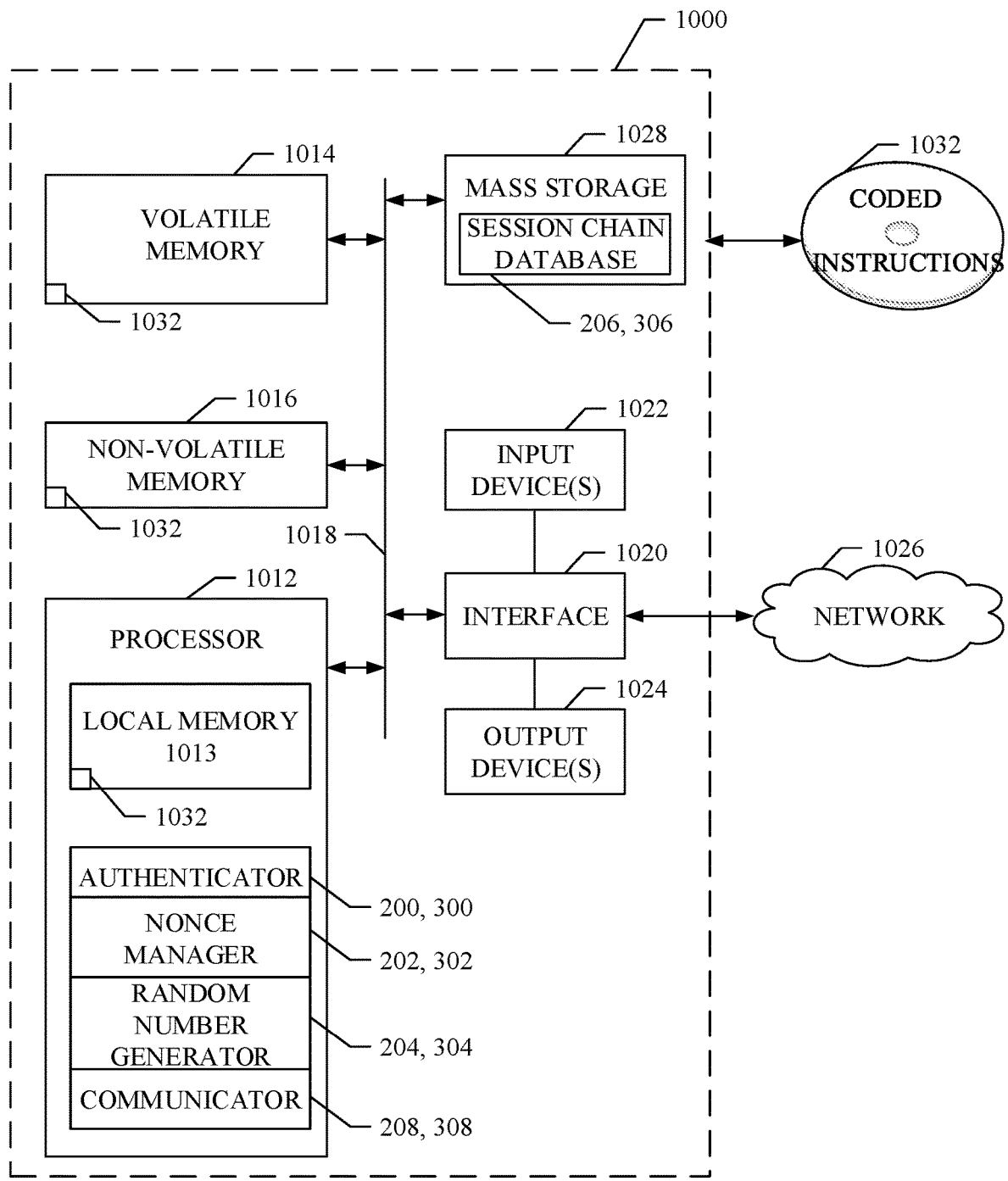
FIG. 10 is a block diagram of an example processor platform to implement the example flowcharts of FIGS. 7-9 to implement the example management devices of FIGS. 1 and/or 2 and/or the example resources of FIGS. 1 and/or 3.

FIG. 10 is a block diagram of an example processor platform 1000 capable of executing the instructions of FIGS. 7-9 to implement any of the example management devices of FIG. 1 and/or FIG. 2 and/or any of the example resources of FIG. 1 and/or FIG. 3. The processor platform 1000 can be, for example, a server, a personal computer, a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). In some examples, the processor 1012 implements the example authenticator 200, the example nonce manager 202, the example random (or pseudo random) number generator 204, and the example communicator 208 for the example management device of FIG. 2. In some examples, the processor 1012 implements the example authenticator 300, the example nonce manager 302, the example random (or pseudo random) number generator 304, and the example communicator 308 for the example resource of FIG. 3.

The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives. In some examples, the one or more mass storage devices 1028 implement the example session chain stacks 206, 306 for the example management device 1 102 and the example resource 1 108a, respectively.

The coded instructions 1032 of FIGS. 7-9 may be stored in the mass storage device 1028, in the volatile memory 1014, in the non-volatile memory 1016, and/or on a removable tangible computer readable storage medium such as a CD or DVD.

From the foregoing, it will be appreciated that methods, apparatus, and articles of manufacture have been disclosed, which distinguish previously indistinguishable resources by negotiating a new nonce during a session. Nonce comparison occurs at the onset of the session, such as, for example, a TLS session, to distinguish resources that were replicated prior to the start of the session. In examples disclosed herein, nonce (re)negotiation need not be performed for each message sent and/or received during the session. Such repeated nonce (re)negotiation is tedious, time consuming, and creates additional overhead. Thus, the above disclosed methods, apparatus, and articles of manufacture reduce machine resources (e.g., cycles) consumed by continuous nonce (re)negotiation, thereby increasing performance and efficiency of management device-resource communication sessions.

Nonce negotiation occurs during and/or at the end of the session to distinguish resources that are replicated prior to or during a session. Above identified methods, apparatus, and articles of manufacture maintain a stack of the most recently negotiated nonce along with previously negotiated nonces. Some examples perform authentication of the identity of a resource based on the nonces negotiated in all previous sessions.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A management device comprising:
    a communicator to conduct a communication session between the management device and a resource;
    an authenticator to:
        locate in a database, a session chain stack associated with an identifier of the resource; and
        determine whether a first nonce associated with the identifier of the resource matches a second nonce, the first nonce at the top of the session chain stack, the second nonce received from the resource in association with the communication session; and
    a nonce manager to re-negotiate the second nonce between the management device and the resource to generate a third nonce.

2. A management apparatus as defined in claim 1, wherein the nonce manager is to push the third nonce onto the top of the session chain stack.

3. A management apparatus as defined in claim 1, wherein, in response to the nonce manager re-negotiating the second nonce between the management device and the resource, the communicator is to initiate a series of communication transactions between the management device and the resource without further re-negotiation of the third nonce.

4. A management apparatus as defined in claim 1, wherein the communicator is to conduct the communication session via an integrity protecting protocol.

5. A management apparatus as defined in claim 1, further including:
    a random number generator to generate a first random value, wherein to re-negotiate the second nonce between the management device and the resource, the nonce manager is to:
        exponentiate a resource key based on a second random value with the first random value; and
        perform a keyed hash function on the exponentiated resource key and the second nonce to generate the third nonce.

6. A management apparatus as defined in claim 1, wherein the resource is a first resource and the authenticator is to reject a session request from a second resource during the communication session.

7. A management apparatus as defined in claim 6, wherein the nonce manager is to, in response to the authenticator rejecting the session request:
    re-negotiate the third nonce between the management device and the first resource to generate a fourth nonce; and
    push the fourth nonce onto the session chain stack.

8. A method comprising:
    locating, by executing an instruction with a processor of a management device, a session chain stack associated with an identifier of a resource for initiating a communication session between the management device and the resource; and
    in response to a first nonce at a top of the session chain stack associated with the identifier of the resource matching a second nonce received from the resource in association with the communication session:
        initiating, by executing an instruction with the processor, the communication session between the management device and the resource; and
        re-negotiating, by executing an instruction with the processor, the second nonce between the management device and the resource to generate a third nonce.

9. A method as defined in claim 8, further including pushing the third nonce onto the top of the session chain stack.

10. A method as defined in claim 8, further including, in response to re-negotiating the second nonce between the management device and the resource, initiating a series of communication transactions between the management device and the resource without further re-negotiation of the third nonce.

11. A method as defined in claim 8, wherein the communication session employs an integrity protecting protocol.

12. A method as defined in claim 8, wherein the re-negotiating of the second nonce between the management device and the resource includes:
    exponentiating a resource key based on a first random value with a second random value generated by the management device; and
    performing a keyed hash function on the exponentiated resource key and the second nonce to create the third nonce.

13. A method as defined in claim 8, wherein the resource is a first resource, further including, upon receiving a session request from a second resource during the communication session, rejecting the session request.

14. A method as defined in claim 13, wherein the session request is associated with the identifier and the session chain stack further including, in response to rejecting the session request:
    re-negotiating the third nonce between the management device and the first resource to generate a fourth nonce; and
    pushing the fourth nonce onto the session chain stack.

15. A non-transitory computer readable storage medium comprising instructions that, when executed, cause a one or more processors to at least:
    locate, by executing an instruction with a processor of a management device, a session chain stack associated with an identifier of a resource for initiating a communication session between the management device and the resource; and
    in response to a first nonce at a top of the session chain stack associated with the identifier of the resource matching a second nonce received from the resource in association with the communication session:

initiate, by executing an instruction with the processor, the communication session between the management device and the resource; and re-negotiate, by executing an instruction with the processor, the second nonce between the management device and the resource to generate a third nonce.

16. A non-transitory computer readable storage medium as defined in claim 15, further including instructions that, when executed, cause the one or more processors to push the third nonce onto the top of the session chain stack.

17. A non-transitory computer readable storage medium as defined in claim 15, further including instructions that, when executed, cause the one or more processors to, initiate a series of communication transactions between the management device and the resource without further re-negotiation of the third nonce.

18. A non-transitory computer readable storage medium as defined in claim 15, further including instructions that, when executed, cause the one or more processors to:

exponentiate a resource key based on a first random value with a second random value generated by the at least one of the management device or the resource; and perform a keyed hash function on the exponentiated resource key and the second nonce to generate the third nonce.

19. A non-transitory computer readable storage medium as defined in claim 15, further including instructions that, when executed, cause the one or more processors to, upon receiving a session request during the communication session, reject the session request.

20. A non-transitory computer readable storage medium as defined in claim 19, further including instructions that, when executed, cause the one or more processors to, in response to rejecting the session request:

re-negotiate the third nonce between the management device and the resource to generate a fourth nonce; and push the fourth nonce onto the session chain stack.

* * * * *